(12) United States Patent
Utsunomiya et al.

(10) Patent No.: US 9,972,847 B2
(45) Date of Patent: May 15, 2018

(54) GAS DIFFUSION ELECTRODE MEDIUM FOR FUEL CELL

(71) Applicant: Toray Industries, Inc., Tokyo (JP)

(72) Inventors: Masamichi Utsunomiya, Otsu (JP); Masaru Hashimoto, Otsu (JP); Toshiya Kamae, Otsu (JP)

(73) Assignee: Toray Industries, Inc. (JP)

( * ) Notice: Subject to any disclaimer, the term of this patent is extended or adjusted under 35 U.S.C. 154(b) by 414 days.

(21) Appl. No.: 14/418,336

(22) PCT Filed: Aug. 9, 2013

(86) PCT No.: PCT/JP2013/071623
§ 371 (c)(1),
(2) Date: Jan. 29, 2015

(87) PCT Pub. No.: WO2014/030553
PCT Pub. Date: Feb. 27, 2014

(65) Prior Publication Data
US 2015/0207151 A1    Jul. 23, 2015

(30) Foreign Application Priority Data
Aug. 24, 2012  (JP) .................................. 2012-184930

(51) Int. Cl.
| | | |
|---|---|---|
| *H01M 4/86* | (2006.01) | |
| *H01M 4/92* | (2006.01) | |
| *H01M 4/96* | (2006.01) | |
| *H01M 8/0234* | (2016.01) | |
| *H01M 8/0243* | (2016.01) | |
| *H01M 8/0245* | (2016.01) | |
| *H01M 8/1018* | (2016.01) | |

(52) U.S. Cl.
CPC ....... *H01M 4/8657* (2013.01); *H01M 4/8605* (2013.01); *H01M 4/926* (2013.01); *H01M 4/96* (2013.01); *H01M 8/0234* (2013.01); *H01M 8/0243* (2013.01); *H01M 8/0245* (2013.01); *H01M 2008/1095* (2013.01)

(58) Field of Classification Search
CPC ...... H01M 4/8657; H01M 4/96; H01M 4/926; H01M 4/8605; H01M 4/86; H01M 4/92
See application file for complete search history.

(56) References Cited

FOREIGN PATENT DOCUMENTS

| | | | | |
|---|---|---|---|---|
| CN | 101320819 | 12/2008 | | |
| JP | 2000-123842 | 4/2000 | | |
| JP | 2004-79246 | 3/2004 | | |
| JP | 2004-311431 | 11/2004 | | |
| JP | 2005-285370 | 10/2005 | | |
| JP | 2005285370 A | * 10/2005 | ............. | H01M 4/86 |
| JP | 2006-120506 | 5/2006 | | |
| JP | 2008-201005 | 9/2008 | | |
| JP | 2008201005 A | * 9/2008 | ............. | H01M 4/96 |
| JP | 2010-129299 | 6/2010 | | |
| JP | 2011-076848 | 4/2011 | | |
| TW | 200937712 | 9/2009 | | |
| WO | 2011/74327 | 6/2011 | | |

OTHER PUBLICATIONS

Supplementary European Search Report dated Dec. 15, 2015 of corresponding European Application No. 13830459.7.
The Fist Official Action dated Jun. 1, 2016, of corresponding Chinese Application No. 201380043158.0, along with an English translation.

* cited by examiner

*Primary Examiner* — Karie O'Neill Apicella
(74) *Attorney, Agent, or Firm* — DLA Piper LLP (US)

(57) ABSTRACT

A fuel cell gas diffusion electrode medium has exceptional anti-flooding characteristic and anti-dry-out characteristic, the capability to achieve high cell performance across a wide temperature range from low to high temperatures, and exceptional mechanical properties, electrical conductivity, and thermal conductivity, a microporous layer being arranged on one surface of an electrode base material; wherein the fuel cell gas diffusion electrode medium is characterized in that linear carbon having an aspect ratio of 30-5000 is included in the microporous layer, and the areal weight of the gas diffusion electrode medium is 30-60 g/m2.

20 Claims, No Drawings

GAS DIFFUSION ELECTRODE MEDIUM FOR FUEL CELL

TECHNICAL FIELD

This disclosure relates to a gas diffusion electrode medium suitably used for a fuel cell, particularly for a polymer electrolyte fuel cell. More particularly, the disclosure relates to a gas diffusion electrode medium excellent in its anti-flooding and anti-dry-out characteristics and capable of exerting high cell performance across a wide temperature range from low to high temperatures and has excellent mechanical properties, electrical conductivity and thermal conductivity.

BACKGROUND

A polymer electrolyte fuel cell in which a hydrogen-containing fuel gas and oxygen-containing oxidizing gas are supplied to an anode and cathode, respectively, and an electromotive force is generated by bipolar electrochemical reaction is generally constituted of sequentially laminating a bipolar plate, a gas diffusion electrode medium, a catalyst layer, an electrolyte membrane, a catalyst layer, a gas diffusion electrode medium and a bipolar plate. The gas diffusion electrode medium is required to have high gas diffusibility in an in-plane direction and high gas diffusibility in a direction perpendicular to a plane to allow a gas supplied from the bipolar plate to be diffused into the catalyst layer and a high drainage property to drain liquid water generated by an electrochemical reaction to the bipolar plate as well as high electrical conductivity to extract a generated electric current, and electrode base materials composed of carbon fibers and the like are widely used.

However, the following problems are known: (1) when such a polymer electrolyte fuel cell is operated at a relatively low temperature of below 70° C. in a high current density region, as a result of blockage of the electrode base material by liquid water generated in a large amount and shortage in the fuel gas supply, the cell performance is impaired (this problem is hereinafter referred to as "flooding"); and (2) when such a polymer electrolyte fuel cell is operated at a relatively high temperature of 80° C. or higher, as a result of drying of the electrolyte membrane due to water vapor diffusion and a reduction in the proton conductivity, the cell performance is impaired (this problem is hereinafter referred to as "dry-out"). Various efforts have been made to solve these problems of (1) and (2).

Japanese Patent Laid-open Publication No. 2000-123842 proposes a gas diffusion electrode medium in which a microporous layer composed of a carbon black and a water-repelling resin is formed on the catalyst layer side of an electrode base material with a high areal weight of 167 g/m². According to a fuel cell comprising this gas diffusion electrode medium, since the microporous layer has a fine pore structure having water repellency, drainage of liquid water to the cathode side is inhibited so that flooding tends to be inhibited. In addition, since generated water is forced back to the electrolyte membrane side (hereinafter, this phenomenon is referred to as "back-diffusion"), the electrolyte membrane is wetted and the problem of dry-out thus tends to be inhibited. However, there is a problem that inhibition of flooding and dry-out is still insufficient.

Japanese Patent Laid-open Publication No. 2004-311431 proposes a gas diffusion electrode medium in which a microporous layer composed of a carbon black and a water-repelling resin is formed on the catalyst layer side of an electrode base material with from a relatively low areal weight to a relatively high areal weight of 44 to 92 g/m². It had been expected that in accordance with fuel cells using these gas diffusion electrode medium, flooding would be inhibited due to the improvement of the gas diffusibility of the electrode base material and the drainage properties. However, inhibition of the flooding is still insufficient and there is a problem that dry-out cannot be inhibited.

Japanese Patent Laid-open Publication No. 2006-120506 proposes a gas diffusion electrode medium in which a microporous layer composed of a carbon black, a linear carbon and a water-repelling resin is formed on the catalyst layer side of an electrode base material with a relatively high areal weight of 84 g/m². It had been expected that in accordance with a fuel cell using this gas diffusion electrode medium, flooding would be inhibited due to the improvement of the gas diffusibility of the microporous layer and the drainage properties. However, inhibition of the flooding is still insufficient and there is a problem that dry-out cannot be inhibited.

As described above, various efforts have been made; however, a satisfactory gas diffusion electrode medium which has an excellent anti-flooding characteristic and excellent anti-dry-out characteristic is yet to be discovered.

It could therefore be helpful to provide a gas diffusion electrode medium excellent in its anti-flooding and anti-dry-out characteristics and capable of exerting high cell performance across a wide temperature range from low to high temperatures and has excellent mechanical properties, electrical conductivity and thermal conductivity.

SUMMARY

We thus provide:

(1) A gas diffusion electrode medium for a fuel cell in which a microporous layer is arranged at one surface of an electrode base material, characterized in that the microporous layer contains a linear carbon having an aspect ratio in the range of 30 to 5000, and the areal weight of the gas diffusion electrode medium is in the range of 30 to 60 g/m².

(2) The gas diffusion electrode medium for a fuel cell according to the above (1), wherein the areal weight of the microporous layer is in the range of 10 to 35 g/m².

(3) The gas diffusion electrode medium for a fuel cell according to the above (1) or (2), wherein the thickness of the gas diffusion electrode medium is in the range of 70 to 190 μm.

(4) The gas diffusion electrode medium for a fuel cell according to any one of the above (1) to (3), wherein gas permeation resistance in a direction perpendicular to a plane is in the range of 15 to 190 mmAq.

(5) The gas diffusion electrode medium for a fuel cell according to any one of the above (1) to (4), wherein a ratio of fluorine to carbon is different between one surface and an opposite surface of the electrode base material to be used for the gas diffusion electrode medium, and the microporous layer is arranged on the surface on a side where the ratio of fluorine to carbon is higher.

(6) The gas diffusion electrode medium for a fuel cell according to any one of the above (1) to (5), wherein the microporous layer contains carbon black and a mixing mass ratio of the carbon black to the linear carbon having an aspect ratio in the range of 30 to 5000 is in the range of 0.5 to 20.

(7) The gas diffusion electrode medium for a fuel cell according to any one of the above (1) to (6), wherein a microporous region having an areal ratio in the range of 5 to 70% is arranged on the opposite surface from the surface of the electrode base material on which the microporous layer is arranged.

Flooding can be inhibited by facilitating drainage of liquid water in the gas diffusion electrode medium and, further, dry-out can be inhibited by inhibiting water vapor diffusion. Therefore, when the gas diffusion electrode medium is used, high cell performance can be exerted across a wide temperature range from low to high temperatures. Further, the gas diffusion electrode medium also has good mechanical strength, electrical conductivity and thermal conductivity.

DETAILED DESCRIPTION

The gas diffusion electrode medium is a gas diffusion electrode medium for a fuel cell in which a microporous layer is arranged at one surface of an electrode base material, characterized in that the microporous layer contains a linear carbon having an aspect ratio of 30 to 5000, and the areal weight of the gas diffusion electrode medium is 30 to 60 $g/m^2$. It is noted here that a base material composed of only a carbon paper or the like and is not provided with a microporous region, is referred to as "electrode base material", and a base material formed by providing the electrode base material with a microporous layer is referred to as "gas diffusion electrode medium".

Although it had been expected that in the gas diffusion electrode medium in which a microporous layer composed of carbon black and a water-repelling resin is formed at the catalyst layer side of an electrode base material with a relatively low areal weight, flooding would be improved due to the improvement of the gas diffusibility in an in-plane direction of the electrode base material and the drainage property, the inhibition of flooding is still insufficient and dry-out cannot be inhibited.

Since in forming the microporous layer on the electrode base material with a relatively low areal weight, a carbon coating liquid containing carbon black and a water-repelling resin is usually used as a precursor of the microporous layer while the electrode base material with a relatively low areal weight is used, permeation of the carbon coating liquid into the electrode base material markedly occurs and the carbon coating liquid permeates up to the backside of the electrode base material (referred to as strike through). We found that the inside of the electrode base material is filled with the carbon coating liquid and, therefore, not only the gas diffusibility in an in-plane direction of the electrode base material is deteriorated but also the drainage property is deteriorated, resulting in the insufficient inhibition of flooding. Further, we found that since a microporous layer to be formed on the surface of the electrode base material has an insufficient thickness, the back-diffusion of generated water is insufficient and an electrolyte membrane is dried to fail in the inhibition of the dry-out. Further, we found that when the thickness of the electrode base material is increased in a state of low areal weight to inhibit the strike through, the electrical conductivity of the gas diffusion electrode medium might be deteriorated.

We found that by the following means, it is possible to solve these problems at once and exert high cell performance across a wide temperature range from low temperature to high temperature. That is, we found that when a microporous layer contains a linear carbon having an aspect ratio of 30 to 5000 in forming the microporous layer on a low areal weight electrode base material, permeation of the carbon coating liquid, which is a precursor of the microporous layer, into the electrode base material is moderately suppressed and gas diffusibility in an in-plane direction and drainage properties in the electrode base material portion are improved and, therefore, flooding can be inhibited. Moreover, we found that since a microporous layer having a sufficient thickness is formed on the surface of the electrode base material so that the back-diffusion of generated water is facilitated, the dry-out can be inhibited.

We found that it is necessary to improve the gas diffusibility in an in-plane direction and the gas diffusibility in a direction perpendicular to a plane and the drainage property. However, good balance has to be achieved between these improvements. Thus, we focused on the areal weight of the gas diffusion electrode medium.

We found that by the following means, it is possible to solve these problems at once and exert high cell performance across a wide temperature range from low temperature to high temperature. That is, we found that, when using a relatively low areal weight electrode base material and forming a microporous layer, when the microporous layer contains a linear carbon having an aspect ratio of 30 to 5000 and an areal weight of the gas diffusion electrode medium is 30 to 60 $g/m^2$, since gas diffusibility in an in-plane direction, gas diffusibility in a direction perpendicular to a plane and the drainage properties are improved, flooding can be inhibited. Moreover, we found that since a microporous layer having a sufficient thickness is formed on the surface of the electrode base material so that the back-diffusion of generated water is facilitated, the dry-out can be inhibited.

These constituents will be described below.

The electrode base material is required to have high gas diffusibility in an in-plane direction and high gas diffusibility in a direction perpendicular to a plane to allow a gas supplied from a bipolar plate to be diffused into a catalyst, high drainage property to drain liquid water generated by electrochemical reaction to the bipolar plate, and high electrical conductivity to extract generated electric current.

Therefore, it is preferred to use, as an electrode base material, a carbon fiber-containing porous material such as a carbon fiber woven fabric, carbon fiber non-woven fabric or carbon fiber paper sheet, or a porous metal such as a foamed sintered metal, metal mesh or expanded metal, and thereamong, a carbon fiber-containing porous material is preferably used because of its excellent corrosion resistance and it is more preferred to use a base material on which a carbon fiber paper sheet is bonded with carbide, namely a "carbon paper", because of its excellent mechanical strength. As described below, a base material on which a carbon fiber paper sheet is bonded with carbide can be normally obtained by impregnating a carbon fiber paper sheet with a resin and then carbonizing the resultant.

Examples of the carbon fiber include polyacrylonitrile (PAN)-based, pitch-based and rayon-based carbon fibers. Thereamong, a PAN-based or pitch-based carbon fiber is preferably used because of its excellent mechanical strength.

The carbon fiber has a monofilament mean diameter of preferably 3 to 20 µm, more preferably 5 to 10 µm. When the mean diameter is 3 µm or larger, since the pore size becomes large, the drainage property is improved and flooding can thus be inhibited. Meanwhile, when the mean diameter is 20 µm or smaller, since the water vapor diffusibility is reduced, dry-out can be inhibited. Further, it is preferred to use two or more kinds of carbon fibers having different mean diameters since the surface smoothness of the resulting electrode base material can be thereby improved.

The monofilament mean diameter of a carbon fiber is determined by: taking a photograph of the carbon fibers under a microscope such as a scanning electron microscope at a magnification of 1000 times or greater; randomly selecting 30 different monofilaments; measuring their diameters; and then calculating the average thereof. As the scanning electron microscope, S-4800 manufactured by Hitachi, Ltd. or its equivalent product can be used.

The carbon fiber has a monofilament mean length of preferably 3 to 20 mm, more preferably 5 to 15 mm. When the mean length is 3 mm or longer, the electrode base material has excellent mechanical strength, electrical conductivity and thermal conductivity, which is preferred. Meanwhile, when the mean length is 20 mm or shorter, since excellent carbon fiber dispersibility is attained at the time of papermaking, a homogeneous electrode base material can be obtained, which is preferred. The carbon fiber having such a mean length can be obtained by, for example, a method of cutting a continuous carbon fiber to a desired length.

The mean length of a carbon fiber is determined by: taking a photograph of the carbon fibers under a microscope such as a scanning electron microscope at a magnification of 50 times or greater; randomly selecting 30 different monofilaments; measuring their lengths; and then calculating the average thereof. As the scanning electron microscope, S-4800 manufactured by Hitachi, Ltd. or its equivalent product can be used. The monofilament mean diameter and mean length of a carbon fiber is usually measured by directly observing the carbon fiber serving as a raw material. However, they may also be measured by observing the electrode base material.

The areal weight of the electrode base material is as low as preferably 20 to 50 $g/m^2$, more preferably 45 $g/m^2$ or less, and still more preferably 40 $g/m^2$ or less. Further, the areal weight is more preferably 25 $g/m^2$ or more, and still more preferably 30 $g/m^2$ or more. When the areal weight of the electrode base material is 20 $g/m^2$ or more, the amount of carbon fibers per area constituting the electrode base material is more preferred, and therefore the electrical conductivity is more improved, the electrical conductivity of the resulting gas diffusion electrode medium is more enhanced, and the cell performance is more improved at both high and low temperatures. Further, since the mechanical strength of the electrode base material is more improved, an electrolyte membrane and a catalyst layer can be more preferably supported thereon. Meanwhile, when the areal weight of the electrode base material is 50 $g/m^2$ or less, since the gas diffusibility in a direction perpendicular to a plane of the electrode base material is more improved and the gas diffusibility in a direction perpendicular to a plane of the resulting gas diffusion electrode medium is more increased, the cell performance is more improved at both high and low temperatures.

An electrode base material having such an areal weight can be obtained in the production method described later by controlling the carbon fiber areal weight of a prepreg and the amount of the resin component to be compounded with respect to the carbon fibers. It is noted here that a carbon fiber-containing paper sheet impregnated with a resin composition is referred to as "prepreg". A low-areal weight base material can be obtained by reducing the carbon fiber areal weight of the prepreg and a high-areal weight base material can be obtained by increasing the carbon fiber areal weight. Further, a low-areal weight base material can be obtained by reducing the amount of the resin component to be compounded with respect to the carbon fibers and a high-areal weight base material can be obtained by increasing the amount of the resin component. The areal weight means a mass per unit area.

The areal weight of an electrode base material can be determined by dividing a mass of the electrode base material, weighed using an electronic balance, by the area of an X-Y plane of the electrode base material.

It is necessary that the areal weight of the gas diffusion electrode medium is as low as 30 to 60 $g/m^2$. The areal weight is preferably 55 $g/m^2$ or less, and more preferably 50 $g/m^2$ or less. Further, the areal weight is preferably 35 $g/m^2$ or more, and more preferably 40 $g/m^2$ or more. When the areal weight of the gas diffusion electrode medium is less than 30 $g/m^2$, the amounts of carbon fibers and carbon-based fillers per area constituting the gas diffusion electrode medium are small and the gas diffusion electrode medium becomes low in the electrical conductivity, and the cell performance may be deteriorated at both high and low temperatures. Meanwhile, when the areal weight of the gas diffusion electrode medium is more than 60 $g/m^2$, since the gas diffusibility in an in-plane direction and the gas diffusibility in a direction perpendicular to a plane of the gas diffusion electrode medium are both reduced, the cell performance may be deteriorated at both high and low temperatures. A gas diffusion electrode medium having such an areal weight can be obtained by controlling the areal weight of the electrode base material and the areal weight of the microporous layer.

The areal weight of a gas diffusion electrode medium can be determined by dividing a mass of the gas diffusion electrode medium, which is weighed using an electronic balance, by the area of an X-Y plane of the gas diffusion electrode medium.

The pore size of the electrode base material is preferably 30 to 80 μm, more preferably 40 to 75 μm, and still more preferably 50 to 70 μm. When the pore size is 30 μm or larger, the drainage property is more improved and flooding can thus be more inhibited. When the pore size is 80 μm or smaller, higher electrical conductivity is attained and the cell performance is thus more improved at both high and low temperatures. To design the electrode base material to have a pore size in such a range, it is effective to allow the electrode base material to contain both a carbon fiber having a monofilament mean diameter of 3 to 8 μm and a carbon fiber having a monofilament mean diameter of 8 μm or larger.

The pore size of the electrode base material is determined as a peak of a pore size distribution obtained by measuring the pores by a mercury intrusion technique at a pressure of 6 kPa to 414 MPa (pore size: 30 nm to 400 μm). When a plurality of peaks are obtained, the highest peak value is adopted. As a measuring apparatus, AutoPore 9520 manufactured by Shimadzu Corporation or its equivalent product can be used.

The thickness of the electrode base material is preferably 50 to 160 μm, more preferably 140 μm or smaller, and still more preferably 120 μm or smaller. Further, the thickness is more preferably 60 μm or larger, and still more preferably 70 μm or larger. When the thickness of the electrode base material is 50 μm or larger since the gas diffusibility in an in-plane direction is more preferred and gas can be more easily supplied to a catalyst present below a rib of the bipolar plate, the cell performance is more improved at both high and low temperatures. Further, since the mechanical strength of the electrode base material is more improved, an electrolyte membrane and a catalyst layer can be more preferably supported thereon. Meanwhile, when the thickness of the electrode base material is 150 μm or smaller, since a path for drainage is shorter, the drainage property is more improved and flooding can thus be more inhibited, and a path for electrical conduction is shorter and the electrical conductivity can thus be more improved, and the cell performance is more improved at both high and low temperatures. An electrode base material having such a thickness can be obtained, in the production method described later, by controlling the thickness at the time of heat treatment.

The thickness of the electrode base material can be determined using a micrometer under a condition in which the electrode base material is compressed at a contact pressure of 0.15 MPa.

The thickness of the gas diffusion electrode medium is preferably 70 to 190 µm, more preferably 170 µm or smaller, and still more preferably 150 µm or smaller. Further, the thickness is preferably 70 µm or larger, more preferably 80 µm or larger, and still more preferably 90 µm or larger. When the thickness of the gas diffusion electrode medium is 70 µm or larger since the gas diffusibility in an in-plane direction is more preferred and gas can be more easily supplied to a catalyst present below a rib of the bipolar plate, the cell performance is more improved at both high and low temperatures. Meanwhile, when the thickness of the gas diffusion electrode medium is 190 µm or smaller, the drainage property is more improved and flooding can thus be more inhibited, and a path for electrical conduction is shorter and the electrical conductivity can thus be more improved, and the cell performance is more improved at both high and low temperatures. A gas diffusion electrode medium having such a thickness can be obtained by controlling the thickness of the electrode base material and the thickness of the microporous layer.

The thickness of the gas diffusion electrode medium can be determined using a micrometer under a condition in which the gas diffusion electrode medium is compressed at a contact pressure of 0.15 MPa.

It is necessary that a microporous layer is arranged at one surface of an electrode base material. The microporous layer is required to have high gas diffusibility in a direction perpendicular to a plane to allow a gas supplied from a bipolar plate to be diffused into a catalyst, a high drainage property to drain liquid water generated by an electrochemical reaction to the bipolar plate, and high electrical conductivity to extract a generated electric current. Moreover, the microporous layer also has a function of facilitating back-diffusion of a water content back to the electrolyte membrane and wetting the electrolyte membrane.

The areal weight of the microporous layer is preferably 10 to 35 g/m$^2$, more preferably 30 g/m$^2$ or less, and still more preferably 25 g/m$^2$ or less. Further, the areal weight of the microporous layer is more preferably 14 g/m$^2$ or more, and still more preferably 16 g/m$^2$ or more. When the areal weight of the microporous layer is 10 g/m$^2$ or more, since the surface of the electrode base material can be covered more finely so that the back-diffusion of generated water is facilitated, the dry-out can be more inhibited. Further, when the areal weight of the microporous layer is 35 g/m$^2$ or less, the drainage property is more improved and flooding can thus be more inhibited.

A porous material containing a linear carbon and a water-repelling material is preferably used for the microporous layer from the viewpoint of improving electrical conductivity and the drainage property.

It is necessary to use a linear carbon having an aspect ratio of 30 to 5000 as the linear carbon for the microporous layer. When using such a linear carbon, since the permeation of the carbon coating liquid, which is a precursor of the microporous layer, into the electrode base material is moderately suppressed, and the gas diffusibility in an in-plane direction and the drainage properties are improved, flooding can be inhibited and, further, since a microporous layer having a sufficient thickness is formed on the surface of the electrode base material so that the back-diffusion of generated water is facilitated, the dry-out can be inhibited. When the aspect ratio of the linear carbon is less than 30, since entanglement of the linear carbons in the carbon coating liquid is reduced and therefore viscosity of the carbon coating liquid is decreased, strike through of the carbon coating liquid cannot be inhibited. Meanwhile, when the aspect ratio of the linear carbon is more than 5000, since entanglement of the linear carbons in the carbon coating liquid is excessive, there is a problem that coagulation or settling of a solid content occurs in the carbon coating liquid. The aspect ratio of the linear carbon is more preferably 3000 or less, and still more preferably 1000 or less. Further, the aspect ratio of the linear carbon is more preferably 35 or more, and still more preferably 40 or more.

The aspect ratio of the linear carbon means mean length (µm)/mean diameter (µm). The mean length is determined by taking a photograph of the linear carbon under a microscope such as a scanning electron microscope or a transmission electron microscope at a magnification of 1000 times or greater; randomly selecting 10 different linear carbons; measuring their lengths; and then calculating the average thereof, and the mean diameter is determined by: taking a photograph of the linear carbon under a microscope such as a scanning electron microscope or a transmission electron microscope at a magnification of 10000 times or greater; randomly selecting 10 different linear carbons; measuring their diameters; and then calculating the average thereof. As the scanning electron microscope, S-4800 manufactured by Hitachi, Ltd. or its equivalent product can be used.

As the linear carbon having a specific aspect ratio, a linear carbon having a specific aspect ratio is preferably used. Examples of the linear carbon include a vapor phase growth carbon fiber, single-wall carbon nanotube, double-wall carbon nanotube, multi-wall carbon nanotube, carbon nanohorn, carbon nanocoill, cup stacked carbon nanotube, bamboo-shaped carbon nanotube, and graphite nanofiber. Among these, examples of suitable linear carbons include, because of a large aspect ratio and excellent electrical conductivity and mechanical properties, a vapor phase growth carbon fiber, single-wall carbon nanotube, double-wall carbon nanotube, and multi-wall carbon nanotube. The vapor phase growth carbon fiber is a carbon fiber formed by growing carbon in a vapor phase by the action of a catalyst, and the carbon fiber preferably has a mean diameter of 5 to 200 nm and a mean fiber length of 1 to 20 µm.

When the linear carbon having a specific aspect ratio is used, its mean length is preferably 0.1 to 30 µm, more preferably 1 to 20 µm, and still more preferably 2 to 15 µm. In such a linear carbon, when its mean length is 0.1 µm or longer, viscosity of the carbon coating liquid is more increased and the strike through is more inhibited, and the gas diffusibility in an in-plane direction of the electrode base material and the drainage property are more improved and flooding can thus be more inhibited.

The microporous layer has to contain a linear carbon having a specific aspect ratio. However, the microporous layer may further contain a variety of carbon-based fillers other than such a linear carbon. Examples of the carbon-based filler not having a specific aspect ratio include carbon blacks such as furnace blacks, acetylene blacks, lampblacks and thermal blacks; graphite having an aspect ratio out of 30 to 5000 such as scale-like graphite, scaly graphite, amorphous graphite, synthetic graphite, expanded graphite and flake graphite; and linear carbons having an aspect ratio out of 30 to 5000 such as carbon nanotubes (CNT) and, thereamong, carbon black is more preferably used and acetylene black is most preferably used.

When carbon black is used as the carbon-based filler not having a specific aspect ratio, a mixing mass ratio of the carbon black to the linear carbon having a specific aspect ratio is preferably 0.5 to 20, more preferably 1 to 19, and still more preferably 2 to 10. When such a mixing mass ratio is 0.5 or more since the porosity of the microporous layer containing the linear carbon having a specific aspect ratio and carbon black is at a more appropriate level, the water vapor diffusibility can be more reduced and dry-out can be more inhibited. When such a mixing mass ratio is 20 or less, since by the effect of compounding a linear carbon having a specific aspect ratio, permeation of the carbon coating liquid, which is a precursor of the microporous layer, into the electrode base material is moderately suppressed so that the gas diffusibility in an in-plane direction and the drainage property are improved, flooding can be inhibited, and further since a microporous layer having a sufficient thickness is formed on the surface of the electrode base material so that the back-diffusion of generated water is facilitated, the dry-out can be inhibited.

It is preferred that the microporous layer contains a water-repelling material in combination with the linear carbon from the viewpoint of facilitating drainage of liquid water. Among the water-repelling materials, fluorine-based polymers are preferably used as the water-repelling material because of its excellent corrosion resistance. Examples of the fluorine-based polymers include polytetrafluoroethylene (PTFE), tetrafluoroethylene-hexafluoropropylene copolymers (FEP) and tetrafluoroethylene-perfluoroalkylvinyl ether copolymers (PFA).

It is possible to use a variety of materials in combination with the linear carbon for the microporous layer from the viewpoint of facilitating drainage of liquid water and inhibiting water vapor diffusion. For example, so that the pore size of the microporous layer is increased and drainage of liquid water is facilitated, a dissipation material can be used. The dissipation material means a material which disappears by burning off to form voids when the material is heated to 300° C. to 380° C. for 5 to 20 minutes to melt the water-repelling material, and thereby forming a microporous layer by serving as a binder for the linear carbons. Specific examples thereof include particles and fibers of polymethyl methacrylate, polystyrene or the like.

The porosity of the microporous layer is preferably 60 to 85%, more preferably 65 to 80%, and still more preferably 70 to 75%. When the porosity of the microporous layer is 60% or higher, the drainage property is more improved and flooding can thus be more inhibited. When the porosity is 85% or less, the water vapor diffusibility can be more reduced and dry-out can be more inhibited. Furthermore, high electrical conductivity is attained and the cell performance is thus improved at both high and low temperatures.

A microporous layer having such a porosity can be obtained, in the production method described later, by controlling the areal weight of the microporous layer, the amount of the carbon-based filler to be compounded with respect to the water-repelling material and other materials, the kind of carbon-based filler, and the thickness of the microporous layer. Among these means, it is effective to control the amount of the carbon-based filler to be compounded with respect to the water-repelling material and other materials and the kind of carbon-based filler. A high-porosity microporous layer can be obtained by increasing the amount of the carbon-based filler to be compounded with respect to the water-repelling material and other materials and a low-porosity microporous layer can be obtained by reducing the amount of the carbon-based filler to be compounded with respect to the water-repelling material and other materials.

The porosity of the microporous layer is determined by: using a sample for cross section observation prepared by use of an ion beam cross section machining apparatus; taking a photograph of a cross section under a microscope such as a scanning electron microscope at a magnification of 1000 times or greater; measuring an area of voids; and then calculating an area ratio of the voids to an observed area. As the scanning electron microscope, S-4800 manufactured by Hitachi, Ltd. or its equivalent product can be used.

While it is necessary to arrange a microporous layer at one surface of an electrode base material, the electrode base material is preferably impregnated with a part of the microporous layer from the viewpoint that electrical resistance between a bipolar plate and the gas diffusion electrode medium can be reduced.

Gas permeation resistance in a direction perpendicular to a plane is used as an index of the gas diffusibility in a direction perpendicular to a plane. The smaller gas diffusion resistance in a direction perpendicular to a plane of the gas diffusion electrode medium is, the higher the gas diffusibility in a direction perpendicular to a plane is. The gas permeation resistance in a direction perpendicular to a plane is preferably 15 to 190 mmAq, more preferably 180 mmAq or less, and still more preferably 170 mmAq or less. Further, the gas permeation resistance is more preferably 25 mmAq or more, and still more preferably 50 mmAq or more. When the gas diffusion resistance in a direction perpendicular to a plane is 15 mmAq or more, water vapor diffusibility is more reduced and dry-out can be more inhibited. Further, when gas diffusion resistance in a direction perpendicular to a plane is 190 mmAq or less, the gas diffusibility in a direction perpendicular to a plane is more improved and high cell performance is more easily exerted across a wide temperature range from low to high temperatures. With respect to the gas permeation resistance in a direction perpendicular to a plane of the gas diffusion electrode medium, a circular sample having a diameter of 4.7 cm cut out from the gas diffusion electrode medium was used, and a differential pressure between a surface on the microporous layer side and a surface on the opposite side was measured by a differential pressure instrument at the time when air was passed through the sample at a flow rate of 58 cc/min/cm$^2$ from the surface on the microporous layer side to the surface on the opposite side, and the measured differential pressure was taken as gas permeation resistance in a direction perpendicular to a plane.

From the viewpoint of improving the electrical conductivity of the gas diffusion electrode medium, the microporous region is preferably arranged on an electrode base material surface opposite to the surface on a side where the microporous layer is arranged. By having the microporous region on the surface of the electrode base material, the microporous region serves as a conductive path and, therefore, the electrical conductivity can be improved. When the microporous layer and the microporous region are arranged on the surface of an electrode base material, the microporous region preferably contains a carbon-based filler, and the carbon-based filler is preferably flake graphite. An areal ratio of the microporous region is preferably 5 to 70%.

The term "areal ratio" used herein refers to a proportion of a projected area covered with the microporous region with respect to a projected area of one surface of the electrode base material at the time of taking a photograph of both surfaces of the gas diffusion electrode medium using a digital camera. When the areal ratio is measured after the gas diffusion electrode medium is incorporated into a membrane electrode assembly or the like, the areal ratio may be determined by use of the following method. Using a microscope such as a scanning electron microscope, 100 different points are randomly selected from a cross section of the gas diffusion electrode medium, a photograph of each of the 100 points is taken at a magnification of about 40 times, a proportion of a projected area of an electrode base material surface covered with the microporous region is measured in each photographic image, and an average of areal ratios of the microporous region in the respective photographic images is taken as the areal ratio. As the scanning electron microscope, S-4800 manufactured by Hitachi, Ltd. or its equivalent product can be used.

It is preferred that the microporous region is patterned. The term "pattern-like" or "pattern" refers to a design which is repeated with a certain interval. It is preferred that an area of 100 cm$^2$ or smaller contains such repeating intervals and it is more preferred that an area of 10 cm$^2$ or smaller contains such repeating intervals. By making the interval small, the in-plane variation of the performances such as electrical conductivity and a drainage property can be reduced. When a plurality of gas diffusion electrode media are prepared, the presence or absence of such an interval may be verified by comparing the thus obtained sheets with each other. Examples of the patterns include a lattice, a stripe, a concentric circle, an island pattern and the like.

It is preferred to arrange the microporous region to be patterned at the bipolar plate side from the viewpoint that electrical resistance between the bipolar plate and the gas diffusion electrode medium can be reduced.

Next, a method suitable of obtaining the gas diffusion electrode medium will be concretely described.

Paper Sheet and Production Method Thereof

To obtain a carbon fiber-containing paper sheet, for example, a wet papermaking method in which a carbon fiber-containing paper sheet is produced by dispersing carbon fibers in a liquid or a dry papermaking method in which a carbon fiber-containing paper sheet is produced by dispersing carbon fibers in the air is employed. Thereamong, a wet papermaking method is preferably employed because of its excellent productivity.

For the purpose of improving the drainage property and gas diffusibility in an in-plane direction of the electrode base material, carbon fibers can be mixed with organic fibers to produce a paper sheet. As the organic fiber, for example, a polyethylene fiber, a vinylon fiber, a polyacetal fiber, a polyester fiber, a polyamide fiber, a rayon fiber or an acetate fiber can be used.

Further, for the purpose of improving the shape-retaining property and ease of handling of the paper sheet, an organic polymer can be incorporated as a binder. As the organic polymer, for example, polyvinyl alcohol, polyvinyl acetate, polyacrylonitrile or cellulose can be used.

To maintain the in-plane electrical conductivity and thermal conductivity to be isotropic, the paper sheet is preferably in the form of a sheet in which carbon fibers are randomly dispersed in a two-dimensional plane.

Although the pore size distribution obtained for the paper sheet is influenced by the content and dispersion state of the carbon fibers, the pores can be formed at a size of about 20 to 500 μm.

The paper sheet has a carbon fiber areal weight of preferably 10 to 40 g/m$^2$, more preferably 15 to 35 g/m$^2$, and still more preferably 20 to 30 g/m$^2$. When the carbon fiber areal weight is 10 g/m$^2$ or greater, the electrode base material has excellent mechanical strength, which is preferred. Meanwhile, when the carbon fiber areal weight is 40 g/m$^2$ or less, the electrode base material has excellent gas diffusibility in an in-plane direction and drainage property, which is also preferred. In addition, when a plurality of paper sheets are laminated to one another, it is preferred that the post-bonding carbon fiber areal weight be in the above-described range.

The carbon fiber areal weight in the electrode base material can be determined by retaining a paper sheet cut into a 10-cm square under a nitrogen atmosphere in a 450° C. electric furnace for 15 minutes to remove organic matters, and then dividing the weight of the resulting residue obtained by removal of organic matters by the area of the paper sheet (0.1 m$^2$).

Impregnation with Resin Composition

As a method of impregnating a carbon fiber-containing paper sheet with a resin composition, for example, a method of dipping a paper sheet into a resin composition-containing solution, a method of applying a resin composition-containing solution onto a paper sheet or a method of laminating and transferring a film composed of a resin composition onto a paper sheet are employed. Thereamong, a method of dipping a paper sheet into a resin composition-containing solution is preferably employed because of its excellent productivity.

The resin composition is preferably one which is carbonized by baking to yield an electrically conductive carbide. The term "resin composition" refers to a resin component to which a solvent or the like is added as required. The term "resin component" refers to a component which contains a resin such as a thermosetting resin and, as required, an additive(s) such as a carbon-based filler and a surfactant.

More particularly, it is preferred that the carbonization yield of the resin component contained in the resin composition be 40% by mass or higher. When the carbonization yield is 40% by mass or higher, the electrode base material attains excellent mechanical properties, electrical conductivity and thermal conductivity, which is preferred.

Examples of the resin constituting the resin component include thermosetting resins such as phenolic resins, epoxy resins, melamine resins and furan resins. Thereamong, a phenolic resin is preferably used because of its high carbonization yield. Further, as an additive to be added to the resin component as required, a carbon-based filler can be added for the purpose of improving the mechanical properties, electrical conductivity and thermal conductivity of the electrode base material. As the carbon-based filler, for example, a carbon black, a carbon nanotube, a carbon nanofiber, a milled carbon fiber, graphite or flake graphite can be used.

A resin component obtained by the above-described constitution may be used as is or the resin composition containing a variety of solvents, as required, for the purpose of enhancing the impregnation of the paper sheet with the resin composition may be used. As the solvent, for example, methanol, ethanol or isopropyl alcohol can be used.

It is preferred that the resin composition be in a liquid form under a condition of 25° C. and 0.1 MPa. When the resin composition is in a liquid form, the impregnation of a paper sheet with the resin composition is excellent so that the electrode base material has excellent mechanical properties, electrical conductivity and thermal conductivity, which is preferred.

The paper sheet is impregnated with a resin component in an amount of preferably 30 to 400 parts by mass, more preferably 50 to 300 parts by mass, with respect to 100 parts by mass of the carbon fibers. When the impregnation amount of a resin component is 30 parts by mass or more, the electrode base material has excellent mechanical properties, electrical conductivity and thermal conductivity, which is preferred. Meanwhile, when the impregnation amount of a resin composition is 400 parts by mass or less, the electrode base material has excellent gas diffusibility in an in-plane direction and excellent gas diffusibility in a direction perpendicular to a plane, which is also preferred.

Lamination and Heat Treatment

After forming a prepreg in which a carbon fiber-containing paper sheet is impregnated with a resin composition but before carbonization, the thus obtained prepreg can be laminated and/or heat-treated.

To allow the electrode base material to have a prescribed thickness, a plurality of prepregs can be laminated. In this case, a plurality of prepregs having the same properties can be laminated to one another, or a plurality of prepregs having different properties can be laminated to one another. Specifically, it is possible to laminate a plurality of prepregs that are different in terms of, for example, the mean diameter and mean length of the carbon fibers, the carbon fiber areal weight of the paper sheet or the impregnation amount of a resin component.

The prepreg can be subjected to heat-treating to increase the viscosity of the resin composition or partially cross-link the resin composition. As a heat-treating method, for example, a method of blowing hot air against the prepreg, a method of heating the prepreg by sandwiching it between hot plates of a press apparatus or a method of heating the prepreg by sandwiching it between continuous belts can be employed.

Carbonization

After impregnating the carbon fiber-containing paper sheet with the resin composition, the resulting paper sheet is baked in an inert atmosphere to perform carbonization. For this baking, a batch-type heating furnace or a continuous heating furnace can be used. Further, the inert atmosphere can be achieved by allowing an inert gas such as nitrogen gas or argon gas to flow in the furnace.

The highest temperature in the baking is preferably 1300 to 3000° C., more preferably 1700 to 3000° C., and still more preferably 1900 to 3000° C. When the highest temperature is 1300° C. or higher, carbonization of the resin component is facilitated so that the resulting electrode base material attains excellent electrical conductivity and thermal conductivity, which is preferred. Meanwhile, when the highest temperature is 3000° C. or lower, the operating cost of the heating furnace is reduced, which is also preferred.

It is preferred that the temperature ramp rate in the baking be 80 to 5000° C./min. When the temperature ramp rate is 80° C./min or higher, excellent productivity is preferably attained. Meanwhile, when the temperature ramp rate is 5000° C./min or lower, since carbonization of the resin component slowly proceeds and a dense structure is formed, the resulting electrode base material attains excellent electrical conductivity and thermal conductivity, which is preferred.

A carbon fiber-containing paper sheet which is impregnated with a resin composition and then carbonized is referred to as "baked carbon fiber paper".

Water Repellent Treatment

To improve the drainage property, the baked carbon fiber paper is preferably subjected to a water repellent treatment. The water repellent treatment can be performed by applying a water-repelling material onto the baked carbon fiber paper and heat-treating the water-repelling material. As a water-repelling material, a fluorine-based polymer is preferably used because of its excellent corrosion resistance. Examples of the fluorine-based polymers include polytetrafluoroethylene (PTFE), tetrafluoroethylene-hexafluoropropylene copolymers (FEP) and tetrafluoroethylene-perfluoroalkylvinyl ether copolymers (PFA). The amount of the water-repelling material to be coated is preferably 1 to 50 parts by mass, and more preferably 3 to 40 parts by mass with respect to 100 parts by mass of the baked carbon fiber paper. When the amount of the water-repelling material to be coated is 1 part by mass or more, the resulting electrode base material has an excellent drainage property, which is preferred. Meanwhile, when the amount of the water-repelling material to be coated is 50 parts by mass or less, the resulting electrode base material has excellent electrical conductivity, which is also preferred.

A water repellent treatment of the baked carbon fiber paper is preferably performed to make a difference in the amount of the water-repelling material between two surfaces of the baked carbon fiber paper. That is, it is preferred that a ratio of fluorine to carbon is different between one surface and an opposite surface of the electrode base material to be used for the gas diffusion electrode medium, and the microporous layer is arranged on the surface on the side where a ratio of fluorine to carbon is higher. By arranging the microporous layer on the surface on the side where a ratio of fluorine to carbon is higher, the carbon coating liquid that forms a microporous layer becomes more hard to penetrate into the electrode base material and the strike through is more inhibited. As a result of this, the gas diffusibility in an in-plane direction of the electrode base material is more improved and the cell performance of a fuel cell is more improved. Further, since the carbon coating liquid becomes hard to penetrate into the electrode base material and a microporous layer is formed at a more preferable thickness on the surface of the electrode base material, drying of the electrolyte membrane is more inhibited by the back-diffusion of generated water and dry-out is also more inhibited.

The phrase "a ratio of fluorine to carbon is different between one surface and an opposite surface of the electrode base material" refers to a state in which the index of the distribution of a water-repelling material in the electrode base material, described later, is larger than 1.5. The index of the distribution of a water-repelling material is in the range of more preferably 2 to 10, and still more preferably 4 to 8. When the index of the distribution of a water-repelling material is 2 or more and the microporous layer is arranged on the surface on the side where a ratio of fluorine to carbon is higher, the carbon coating liquid to form a microporous layer becomes more hard to penetrate into the electrode base material and the strike through is more inhibited. When the index of the distribution of a water-repelling material is less than 10 and the microporous layer is arranged on the surface on the side where a ratio of fluorine to carbon is higher, since water repellency of a bipolar plate side is more maintained, drainage of water is more facilitated at an interface between the bipolar plate and the gas diffusion electrode medium.

The index of the distribution of a water-repelling material is determined as follows. First, a sample for cross section observation in a thickness direction of the electrode base material prepared by use of an ion beam cross section machining apparatus is used, and a scanning electron microscope (SEM)-EDX measurement is carried out at a magnification of 400 times at an accelerating voltage of 10 kV to obtain an element-mapping image of carbon and fluorine in a cross section in a thickness direction. Next, the obtained element-mapping image of a cross section in a thickness direction is divided into two parts at an intermediate position between one surface and its opposite surface of the electrode base material, and a ratio (F/C ratio) of the average of fluorine signal-intensity to the average of carbon signal-intensity is calculated in each of the side where the microporous layer is arranged (microporous layer side) and its opposite side (bipolar plate side), and further a ratio (microporous layer side/bipolar plate side) of the F/C ratio of the microporous layer side to the F/C ratio of the bipolar plate side is calculated, and the calculated ratio is taken as an index of the distribution of a water-repelling material.

When it is impossible to determine the F/C ratio by use of the element-mapping image, the results of line scan measurement of SEM-EDX may be used. When line scanning is performed, measurement is carried out 5 times or more at a scan width of 20 μm and a line scan interval of 50 μm and the F/C ratio is calculated in each of the microporous layer side and the bipolar plate side. When it is difficult to discriminate between a surface on the microporous layer side and a surface on the bipolar plate side in dividing the image into two parts in a thickness direction, that is, dividing the image into the microporous layer side and the bipolar plate side, the thickness of the electrode base material can be determined by: using the above-mentioned sample for cross section observation; and using an image of a photograph which is taken at a magnification of 400 times at an accelerating voltage of 10 kV using a scanning electron microscope. As the scanning electron microscope, S-4800 manufactured by Hitachi, Ltd. or its equivalent product can be used. As the energy dispersive X-ray analysis apparatus, EX-220SE manufactured by HORIBA, Ltd. or its equivalent product can be used. In addition, when the index of the distribution of a water-repelling material in the electrode base material cannot be determined for the reason of unavailability of the electrode base material, an index of the distribution of a water-repelling material, which is determined by the above-mentioned method using the sample for cross section observation in a thickness direction of the gas diffusion electrode medium or the membrane electrode assembly, can be used as a substitute.

A method of making a difference in the amount of the water-repelling material between two surfaces of the baked carbon fiber paper includes a method of applying the water-repelling material onto the baked carbon fiber paper from one side of the baked carbon fiber paper using a die coater; and a method of dipping the baked carbon fiber paper into a dispersion liquid of the water-repelling material, uniformly coating and impregnating, in a thickness direction, the baked carbon fiber paper with the dispersion liquid, and then wiping the dispersion liquid on one side off. Among these methods, in the low areal weight electrode base material, the method of dipping the baked carbon fiber paper into a dispersion liquid of the water-repelling material, uniformly coating and impregnating, in a thickness direction, the baked carbon fiber paper with the dispersion liquid, and then wiping the dispersion liquid on one side off, is more preferred since the porosity is high, the thickness is small and the water-repelling material is easily spread over the whole electrode base material in a water repellent treatment. Examples of the method of dipping the baked carbon fiber paper into a dispersion liquid of the water-repelling material, uniformly coating and impregnating, in a thickness direction, the baked carbon fiber paper with the dispersion liquid, and then wiping the dispersion liquid on one side off, include a method of dipping the baked carbon fiber paper into a dispersion liquid of the water-repelling material, uniformly coating and impregnating, in a thickness direction, the baked carbon fiber paper with the dispersion liquid, and then bringing a cloth into contact with the baked carbon fiber paper; a method of dipping the baked carbon fiber paper into a dispersion liquid of the water-repelling material, uniformly coating and impregnating, in a thickness direction, the baked carbon fiber paper with the dispersion liquid, and then sucking the water-repelling material from one side with a suction pump; and a method of dipping the baked carbon fiber paper into a dispersion liquid of the water-repelling material, uniformly coating and impregnating, in a thickness direction, the baked carbon fiber paper with the dispersion liquid, and then bringing a roller into contact with one surface of the baked carbon fiber paper.

The baked carbon fiber paper is equivalent to "electrode base material". As described above, the baked carbon fiber paper is subjected to the water repellent treatment as required. However, it is considered that the baked carbon fiber paper subjected to a water repellent treatment is also equivalent to "electrode base material" (the baked carbon fiber paper not subjected to a water repellent treatment is naturally equivalent to "electrode base material").

Formation of Microporous Layer and Microporous Region

The microporous layer can be formed by applying a carbon coating liquid containing at least a linear carbon having an aspect ratio in the range of 30 to 5000 onto one surface of the electrode base material.

The carbon coating liquid may contain a dispersion medium such as water or an organic solvent or may contain a dispersant aid such as a surfactant. As the dispersion medium, water is preferred, and it is more preferred that a nonionic surfactant be used as the dispersant aid. Further, the carbon coating liquid may contain a variety of carbon-based fillers other than a linear carbon having a specific aspect ratio or a water-repelling material, as described above.

The application of the carbon coating liquid onto the electrode base material can be carried out by using a variety of commercially available coating apparatuses. As an application method, for example, screen printing, rotary screen printing, spraying, intaglio printing, gravure printing, die coating, bar coating or blade coating can be employed. The above-described application methods are presented for the illustration purpose only and the application method is not necessarily limited thereto.

After the application of the carbon coating liquid onto the electrode base material, a coating material is preferably dried at a temperature of 80 to 120° C. That is, the resulting electrode base material coated with the coating material is placed in a dryer whose temperature is 80 to 120° C. and dried for 5 to 30 minutes. The drying air flow may be determined as appropriate. However, rapid drying is not desirable since it may induce generation of microcracks on the surface.

In this way, a solid content (carbon-based filler, water-repelling material, surfactant and the like) in the carbon coating liquid remains after drying to form a microporous layer.

When the microporous layer and the microporous region are arranged on the electrode base material, it is preferred that after the resulting electrode base material whose one surface is coated with a carbon coating liquid is dried, the other surface is coated with a carbon coating liquid and dried again. Drying is carried out for 5 to 30 minutes by placing the resulting electrode base material coated with the coating material in a dryer whose temperature is 80 to 120° C. The drying air flow may be determined as appropriate. However, rapid drying is not desirable since it may induce generation of microcracks on the surface. After drying, the resulting electrode base material coated with the coating material is preferably placed in a muffle furnace, a baking furnace or a high-temperature drying furnace and heated at 300 to 380° C. for 5 to 20 minutes to melt the water-repelling material, and thereby forming a microporous layer by serving as a binder for the carbon-based fillers.

Membrane Electrode Assembly

A membrane electrode assembly can be constituted by joining the above-described gas diffusion electrode medium to at least one side of a solid polymer electrolyte membrane having a catalyst layer on both sides. In this case, by arranging the microporous layer on the catalyst layer side, the back-diffusion of generated water more easily occurs, and in addition to this, a contact area between the catalyst layer and the gas diffusion electrode medium is increased so that electrical contact resistance can be reduced. When the microporous layer and the microporous region are arranged on the electrode base material, the microporous region serves as a conductive path and the electrical conductivity can be improved by arranging the microporous region at the bipolar plate side. Further, since the microporous region has a small areal ratio, it does not interfere with drainage of water from the electrode base material, and therefore flooding can be inhibited.

Fuel Cell

The fuel cell has bipolar plates on both sides of the above-described membrane electrode assembly. That is, the fuel cell is constituted by arranging a bipolar plate on both sides of the above-described membrane electrode assembly. Usually, a polymer electrolyte fuel cell is constituted by laminating a plurality of such membrane electrode assemblies sandwiched between bipolar plates with a gasket interposed between the assembly and the bipolar plate. The catalyst layer is composed of a layer comprising a solid polymer electrolyte and catalyst-supported carbon. As the catalyst, platinum is usually used. In a fuel cell in which a carbon monoxide-containing reformed gas is fed to the anode side, it is preferred to use platinum and ruthenium as catalysts of the anode side. As the solid polymer electrolyte, it is preferred to use a perfluorosulfonic acid-based polymer material having high proton conductivity, oxidation resistance and heat resistance. The constitutions of such fuel cell unit and fuel cell are themselves well known.

EXAMPLES

Hereinafter, our media, fuel cells and methods will be concretely described by way of examples thereof. The methods of preparing the materials, the electrode base materials and the gas diffusion electrode medium, which are used in the examples, and the performance evaluation method of fuel cell are described below.

Preparation of Electrode Base Material

Preparation of Electrode Base Material with Areal Weight of 25 g/m$^2$

Polyacrylonitrile-based carbon fibers "TORAYCA (registered trademark)" T300 manufactured by Toray Industries, Inc. (mean carbon fiber diameter: 7 μm) were cut at a mean length of 12 mm and dispersed in water to continuously prepare a paper sheet by a wet papermaking method. Further, onto the obtained paper sheet, a 10% by mass aqueous solution of polyvinyl alcohol was applied as a binder and then dried to prepare a paper sheet having a carbon fiber areal weight of 15.5 g/m$^2$. The amount of the polyvinyl alcohol to be applied was 22 parts by mass with respect to 100 parts by mass of the paper sheet.

As a thermosetting resin, a carbon-based filler and a solvent, a resin obtained by mixing a resol-type phenolic resin and a novolak-type phenolic resin at a weight ratio of 1:1, scale-like graphite (mean particle size: 5 μm) and methanol, respectively, were mixed at a ratio, thermosetting resin/carbon-based filler/solvent=10 parts by mass/5 parts by mass/85 parts by mass, and the resulting mixture was stirred for 1 minute using an ultrasonic dispersion apparatus to obtain a uniformly dispersed resin composition.

The paper sheet cut into a size of 15 cm×12.5 cm was dipped into an aluminum tray filled with a resin composition and impregnated with the resin composition such that the amount of a resin component (thermosetting resin+carbon-based filler) was 130 parts by mass with respect to 100 parts by mass of carbon fibers, and then the paper sheet was dried by heating it at 100° C. for 5 minutes to prepare a prepreg. Then, the prepared paper sheet was heat-treated at 180° C. for 5 minutes while being pressed by a pressing machine with flat plates. When pressing the prepreg, the space between the upper and lower press plates was adjusted by arranging a spacer in the pressing machine such that the heat-treated prepreg had a thickness of 130 μm.

The thus heat-treated prepreg was introduced into a heating furnace having the highest temperature of 2400° C., in which a nitrogen gas atmosphere was maintained, to obtain a baked carbon fiber paper.

Then, 5 parts by mass of a PTFE resin was added to 95 parts by mass of the obtained baked carbon fiber paper by a method A of water repellent treatment or a method B of water repellent treatment to prepare an electrode base material with an areal weight of 25 g/m$^2$ and a thickness of 100 μm.

Method A of Water Repellent Treatment: A PTFE resin was applied onto the baked carbon fiber paper or the baked carbon fiber paper was impregnated with a PTFE resin by dipping the baked carbon fiber paper in a water dispersion of PTFE resin ("POLYFLON" (registered trademark) PTFE dispersion D-1E (manufactured by Daikin Industries, Ltd.), which was diluted to a concentration suitable for adding 5 parts by mass of a PTFE resin to 95 parts by mass of the baked carbon fiber paper, was used), and the baked carbon fiber paper was heated for 5 minutes in a drying furnace whose temperature was maintained at 100° C. and dried. In drying the baked carbon fiber paper, the baked carbon fiber paper was held vertically, and a vertical direction of the baked carbon fiber paper was reversed every 1 minute to avoid deviation of the distribution in an in-plane direction of a PTFE resin.

Method B of Water Repellent Treatment: A PTFE resin was applied onto the baked carbon fiber paper or the baked carbon fiber paper was impregnated with a PTFE resin by dipping the baked carbon fiber paper in a dispersion of PTFE resin ("POLYFLON" (registered trademark) PTFE dispersion D-1E (manufactured by Daikin Industries, Ltd.), which was diluted to a concentration suitable for adding 5 parts by mass of a PTFE resin to 95 parts by mass of the baked carbon fiber paper, was used), and one surface of the baked carbon fiber paper was brought into contact with a stainless steel roller plated with hard chromium and having a diameter of 100 mm to wipe the PTFE resin on one surface off, and the baked carbon fiber paper was heated for 5 minutes in a drying furnace whose temperature was maintained at 100° C. and dried. In drying the baked carbon fiber paper, the baked carbon fiber paper was horizontally arranged with a surface from which the PTFE resin was wiped off facing down.

Preparation of Electrode Base Material with Areal Weight of 20 g/m²

An electrode base material with an areal weight of 20 g/m² and a thickness of 90 μm was prepared by following the method described in Preparation of Electrode Base Material with Areal Weight of 25 g/m² described above except for changing the carbon fiber areal weight to 15.5 g/m². In addition, a water repellent treatment was performed according to the method described in Method B of Water Repellent Treatment.

Preparation of Electrode Base Material with Areal Weight of 33 g/m²

An electrode base material with an areal weight of 33 g/m² and a thickness of 100 μm was prepared by following the method described in Preparation of Electrode Base Material with Areal Weight of 25 g/m² described above except for changing the amount of the resin component to 210 parts by mass. In addition, a water repellent treatment was performed according to the method described in Method A of Water Repellent Treatment.

Preparation of Electrode Base Material with Areal Weight of 37 g/m²

An electrode base material with an areal weight of 37 g/m² and a thickness of 100 μm was prepared by following the method described in Preparation of Electrode Base Material with Areal Weight of 25 g/m² described above except for changing the amount of the resin component to 250 parts by mass. In addition, a water repellent treatment was performed according to the method described in Method A of Water Repellent Treatment.

Preparation of Electrode Base Material with Areal Weight of 44 g/m²

An electrode base material with an areal weight of 44 g/m² and a thickness of 110 μm was prepared by following the method described in Preparation of Electrode Base Material with Areal Weight of 25 g/m² described above except for changing the carbon fiber areal weight to 20 g/m² and changing the amount of the resin component to 210 parts by mass. In addition, a water repellent treatment was performed according to the method described in Method A of Water Repellent Treatment.

Preparation of Electrode Base Material with Areal Weight of 84 g/m²

An electrode base material with an areal weight of 84 g/m² and a thickness of 190 μm was prepared by following the method described in Preparation of Electrode Base Material with Areal Weight of 25 g/m² described above except that two prepregs prepared by changing the carbon fiber areal weight to 20 g/m² and changing the amount of the resin component to 190 parts by mass were laminated and the resulting laminate was heat-treated while being pressed by a pressing machine with flat plates. In addition, a water repellent treatment was performed according to the method described in Method A of Water Repellent Treatment.

Formation of Microporous Layer and Microporous Region

Materials

C: Linear carbon having an aspect ratio in the range of 30 to 5000

Vapor phase growth carbon fiber "VGCF" (registered trademark) (manufactured by Showa Denko K.K., mean diameter: 0.15 μm, mean fiber length: 8 μm, aspect ratio: 50, a kind of linear carbon)

Vapor phase growth carbon fiber "VGCF-S" (registered trademark) (manufactured by Showa Denko K.K., mean diameter: 0.10 μm, mean fiber length: 11 μm, aspect ratio: 110, a kind of linear carbon)

Multilayer carbon nanotube (manufactured by Cheap Tubes Inc., mean diameter: 0.015 μm, mean fiber length: 20 μm, aspect ratio: 1300, a kind of linear carbon)

Flake graphite "xGnP" (Registered Trademark) grade M (manufactured by XG Sciences Inc., mean particle size: 5 μm, mean thickness: 0.006 μm, aspect ratio: 830)

D: Carbon-based filler having an aspect ratio out of the range of 30 to 5000

Acetylene black "DENKA BLACK" (Registered Trademark) (manufactured by DENKI KAGAKU KOGYO KABUSHIKI KAISHA, mean particle size: 0.035 μm, aspect ratio: 1, a kind of carbon black)

Furnace black "Vulcan" (Registered Trademark) XC-72C (manufactured by Cabot Corporation, mean particle size: 0.030 μm, aspect ratio: 1, a kind of carbon black)

F: Water-repelling material

PTFE resin ("POLYFLON" (registered trademark) PTFE dispersion D-1E (manufactured by Daikin Industries, Ltd.), which is a water dispersion containing 60 parts by mass of a PTFE resin, was used)

G: Others

Surfactant "TRITON" (registered trademark) X-100 (manufactured by Nacalai Tesque, Inc.)

Catalyst Layer Side

A planar microporous layer was formed on an electrode base material using a slit die coater. For the carbon coating liquid used here, a mixture of a carbon-based filler, a water-repelling material, a surfactant and purified water, which was adjusted to have the composition of the carbon coating liquid, shown in Tables 1 to 4, in which the amounts to be compounded are represented by part(s) by weight, was used. In addition, the amount of the PTFE resin to be compounded shown in Tables 1 to 4 represents not the amount of a water dispersion of a PTFE resin to be compounded but the amount of the PTFE resin itself to be compounded. A carbon coating liquid was applied onto the electrode base material using a die coater and heated at 120° C. for 10 minutes and at 380° C. for 10 minutes to form a microporous layer. When the electrode base material of the method B of water repellent treatment was used, a microporous layer was formed on the surface on a side where an index of the distribution of a water-repelling material was larger. When a microporous region was arranged on a bipolar plate side, the microporous region on the bipolar plate side was formed and dried, and then a microporous layer on a catalyst layer side was formed.

Bipolar Plate Side

Using a screen printing plate masked with a resin except for a lattice-shaped pattern part in which straight lines having a line width of 0.5 mm and a line space of 2 mm cross one another at right angles, a lattice-shaped pattern-like microporous region having an areal ratio of 36% was formed on a bipolar plate side of the electrode base material. For the carbon coating liquid used here, a mixture of flake graphite and acetylene black as carbon-based fillers, a water-repelling material, a surfactant and purified water, which was adjusted such that flake graphite/acetylene black/water-repelling material/surfactant/purified water=5.8 parts by mass/1.9 parts by mass/2.5 parts by mass/14 parts by mass/75.8 parts by mass, was used. A carbon coating liquid was applied onto the electrode base material using a screen printing plate and heated at 120° C. for 10 minutes to form a microporous region.

Evaluation of Cell Performance of Polymer Electrolyte Fuel Cell

A catalyst paste was prepared by sequentially adding 1.00 g of platinum-supported carbon (manufactured by Tanaka Kikinzoku Kogyo K.K., platinum carrying amount: 50% by mass), 1.00 g of purified water, 8.00 g of "NAFION" (registered trademark) solution ("NAFION" (registered trademark) manufactured by Aldrich Chemical Co. 5.0% by mass) and 18.00 g of isopropyl alcohol (manufactured by Nacalai Tesque, Inc.) in the order mentioned.

Then, onto a "NAFLON" (registered trademark) PTFE tape "TOMBO" (registered trademark) No. 9001 (manufactured by Nichias Corporation), which was cut into a size of 7 cm×7 cm, the obtained catalyst paste was applied using a spray and dried at room temperature to prepare a PTFE sheet provided with a catalyst layer having a platinum amount of 0.3 mg/cm$^2$. Subsequently, a solid polymer electrolyte membrane, "NAFION" (registered trademark) NRE-211CS (manufactured by DuPont Co.), was cut into a size of 10 cm×10 cm and sandwiched between two PTFE sheets provided with a catalyst layer. The resultant was pressed at a temperature of 130° C. for 5 minutes using a pressing machine with flat plates at a pressure of 5 MPa and thereby transferring the respective catalyst layers to the solid polymer electrolyte membrane. After pressing, the PTFE sheets were removed to prepare a solid polymer electrolyte membrane with a catalyst layer.

Next, the thus obtained solid polymer electrolyte membrane with a catalyst layer was sandwiched between two gas diffusion electrode mediums cut into a size of 7 cm×7 cm and the resultant was pressed at a temperature of 130° C. for 5 minutes using a pressing machine with flat plates at a pressure of 3 MPa, thereby preparing a membrane electrode assembly. The gas diffusion electrode mediums were each arranged such that the surface having the microporous layer was in contact with the catalyst layer.

The thus obtained membrane electrode assembly was incorporated into a fuel cell evaluation unit cell and the voltage in varying the current density was measured. As a bipolar plate, a serpentine-type bipolar plate having one flow channel of 1.5 mm in channel width, 1.0 mm in channel depth and 1.1 mm in rib width was used. Further, the evaluation was carried out with hydrogen not pressurized and air not pressurized fed to the anode side and the cathode side, respectively. The hydrogen and air were both humidified using a humidification pot whose temperature was set at 70° C. The utilization of the hydrogen and atmospheric oxygen were set to 80% and 67%, respectively.

First, the output voltage was measured at an operating temperature of 65° C. and a humidification temperature of 70° C. and at a current density of 2.2 A/cm$^2$ and the measured value was used as an index of the anti-flooding characteristic (low-temperature performance).

Then, the humidification temperature was set at 70° C. and the current density was set at 1.2 A/cm$^2$ and, while repeating a cycle of, from an operating temperature of 80° C., retaining the operating temperature for 5 minutes and then increasing it by 1° C. over a period of 5 minutes, the output voltage was measured to determine the upper limit temperature at which the evaluation unit cell was able to generate power, and the thus obtained value was used as an index of the anti-dry-out characteristic (high-temperature performance).

Measurement of Electric Resistance

The electrical resistance of the gas diffusion electrode medium was determined by passing an electric current of 1.0 A, measuring an electric resistance and multiplying the measured value by an area when a gas diffusion electrode medium cut into a size of 2.23 mm×2.23 mm was sandwiched between two gold-plated plates and a uniform contact pressure of 1.0 MPa was applied to the medium. It is preferred to measure the electric resistance at a relatively low contact pressure and compare the measurements since a high contact pressure causes fracturing of a structure of the gas diffusion electrode medium to fail in measurement of a correct resistance value. When the gas diffusion electrode medium is used as a gas diffusion electrode medium for a fuel cell, the electrical resistance is preferably 9.0 mΩ·cm$^2$ or smaller, and more preferably 7.5 mΩ·cm$^2$ or smaller.

Measurement of Gas Permeation Resistance in Direction Perpendicular to Plane

With respect to the gas permeation resistance in a direction perpendicular to a plane of the gas diffusion electrode medium, a circular sample having a diameter of 4.7 cm cut out from the gas diffusion electrode medium was used, and a differential pressure between a surface on the microporous side and its opposite surface was measured by a differential pressure instrument at the time when air was passed through the sample at a flow rate of 58 cc/min/cm$^2$ from the surface on the microporous side to its opposite surface, and the measured differential pressure was taken as gas permeation resistance in a direction perpendicular to a plane.

Measurement of Index of Distribution of Water-repelling Material

The index of the distribution of a water-repelling material in the electrode base material was determined as follows. First, a sample to observe a cross section in a thickness direction of the electrode base material prepared by use of an ion beam cross section machining apparatus was used, and a scanning electron microscope (SEM)-EDX measurement was carried out at a magnification of 400 times at an accelerating voltage of 10 kV to obtain an element-mapping image of carbon and fluorine in a cross section in a thickness direction. Next, the obtained element-mapping image of a cross section in a thickness direction was divided into two parts at an intermediate position between one surface and its opposite surface of the electrode base material, and a ratio (F/C ratio) of the average of fluorine signal-intensity to the average of carbon signal-intensity was calculated in each of the side where the microporous layer is to be arranged (microporous layer side) and its opposite side (bipolar plate side), and further a ratio (microporous layer side/bipolar plate side) of the F/C ratio of the microporous layer side to the F/C ratio of the bipolar plate side was calculated, and the calculated ratio was taken as an index of the distribution of a water-repelling material. As the scanning electron microscope and the energy dispersive X-ray analysis apparatus, S-4800 manufactured by Hitachi, Ltd. and EX-220SE manufactured by HORIBA, Ltd., respectively, were used. The index of the distribution of a water-repelling material of the gas diffusion electrode medium was also determined by the above-mentioned method. A portion of the electrode base material in a cross section of the gas diffusion electrode medium was identified from an image of a photograph which was taken at a magnification of 400 times at an accelerating voltage of 10 kV using a scanning electron microscope.

Example 1

A gas diffusion electrode medium, which had, on a catalyst layer side of the electrode base material, a planar microporous layer containing vapor phase growth carbon fibers having a specific aspect ratio, shown in Table 1, was obtained according to the methods described in Preparation of Electrode Base Material and Formation of Microporous Layer and Microporous Region. The cell performance of the obtained gas diffusion electrode medium was evaluated and, consequently, the output voltage was 0.39 V (operation temperature: 65° C., humidification temperature: 70° C., current density: 2.2 A/cm$^2$), the upper limit temperature was 90° C. (humidification temperature: 70° C., current density: 1.2 A/cm$^2$) and the electrical resistance was 8.6 mΩ·cm$^2$, and the anti-flooding characteristic, the anti-dry-out characteristic and the electrical conductivity were good together.

Example 2

A gas diffusion electrode medium, which had, on a catalyst layer side of the electrode base material, a planar microporous layer containing vapor phase growth carbon fibers having a specific aspect ratio and acetylene black, shown in Table 1, was obtained according to the methods described in Preparation of Electrode Base Material and Formation of Microporous Layer and Microporous Region. The cell performance of the obtained gas diffusion electrode medium was evaluated and, consequently, the output voltage was 0.39 V (operation temperature: 65° C., humidification temperature: 70° C., current density: 2.2 A/cm$^2$), the upper limit temperature was 91° C. (humidification temperature: 70° C., current density: 1.2 A/cm$^2$) and the electrical resistance was 8.5 mΩ·cm$^2$, and the anti-flooding characteristic, the anti-dry-out characteristic and the electrical conductivity were good together.

Example 3

A gas diffusion electrode medium, which had, on a catalyst layer side of the electrode base material, a planar microporous layer containing vapor phase growth carbon fibers having a specific aspect ratio and acetylene black, shown in Table 1, was obtained according to the methods described in Preparation of Electrode Base Material and Formation of Microporous Layer and Microporous Region. The cell performance of the obtained gas diffusion electrode medium was evaluated and, consequently, the output voltage was 0.40 V (operation temperature: 65° C., humidification temperature: 70° C., current density: 2.2 A/cm$^2$), the upper limit temperature was 92° C. (humidification temperature: 70° C., current density: 1.2 A/cm$^2$) and the electrical resistance was 7.5 mΩ·cm$^2$, and the anti-flooding characteristic and the electrical conductivity were extremely good and the anti-dry-out characteristic was good. A distribution of a water-repelling material of a cross section of the electrode base material was measured before applying the carbon coating liquid onto the electrode base material and, consequently, an index of the distribution of a water-repelling material was 1. The distribution of a water-repelling material of a cross section of the gas diffusion electrode medium was measured after applying and drying the carbon coating liquid, and consequently, the index of the distribution of a water-repelling material was 1.2.

Example 4

A gas diffusion electrode medium, which had, on a catalyst layer side of the electrode base material, a planar microporous layer containing vapor phase growth carbon fibers having a specific aspect ratio and acetylene black, shown in Table 1, was obtained according to the methods described in Preparation of Electrode Base Material and Formation of Microporous Layer and Microporous Region. The cell performance of the obtained gas diffusion electrode medium was evaluated and, consequently, the output voltage was 0.38 V (operation temperature: 65° C., humidification temperature: 70° C., current density: 2.2 A/cm$^2$), the upper limit temperature was 90° C. (humidification temperature: 70° C., current density: 1.2 A/cm$^2$) and the electrical resistance was 9.0 mΩ·cm$^2$, and the anti-flooding characteristic, the anti-dry-out characteristic and the electrical conductivity were good together.

Example 5

A gas diffusion electrode medium, which had, on a catalyst layer side of the electrode base material, a planar microporous layer containing vapor phase growth carbon fibers having a specific aspect ratio and acetylene black, shown in Table 1, was obtained according to the methods described in Preparation of Electrode Base Material and Formation of Microporous Layer and Microporous Region. The cell performance of the obtained gas diffusion electrode medium was evaluated and, consequently, the output voltage was 0.40 V (operation temperature: 65° C., humidification temperature: 70° C., current density: 2.2 A/cm$^2$), the upper limit temperature was 92° C. (humidification temperature: 70° C., current density: 1.2 A/cm$^2$) and the electrical resistance was 7.4 mΩ·cm$^2$, and the anti-flooding characteristic and the electrical conductivity were extremely good, and the anti-dry-out characteristic was good.

Example 6

A gas diffusion electrode medium, which had, on a catalyst layer side of the electrode base material, a planar microporous layer containing multilayer carbon nanotubes having a specific aspect ratio and acetylene black, shown in Table 1, was obtained according to the methods described in Preparation of Electrode Base Material and Formation of Microporous Layer and Microporous Region. The cell performance of the obtained gas diffusion electrode medium was evaluated and, consequently, the output voltage was 0.41 V (operation temperature: 65° C., humidification temperature: 70° C., current density: 2.2 A/cm$^2$), the upper limit temperature was 92° C. (humidification temperature: 70° C., current density: 1.2 A/cm$^2$) and the electrical resistance was 7.3 mΩ·cm$^2$, and the anti-flooding characteristic and the electrical conductivity were extremely good, and the anti-dry-out characteristic was good.

Example 7

A gas diffusion electrode medium, which had, on a catalyst layer side of the electrode base material, a planar microporous layer containing vapor phase growth carbon fibers having a specific aspect ratio and furnace black, shown in Table 1, was obtained according to the methods described in Preparation of Electrode Base Material and Formation of Microporous Layer and Microporous Region. The cell performance of the obtained gas diffusion electrode medium was evaluated and, consequently, the output voltage was 0.40 V (operation temperature: 65° C., humidification temperature: 70° C., current density: 2.2 A/cm$^2$), the upper limit temperature was 92° C. (humidification temperature: 70° C., current density: 1.2 A/cm$^2$) and the electrical resistance was 7.4 mΩ·cm$^2$, and the anti-flooding characteristic and the electrical conductivity were extremely good, and the anti-dry-out characteristic was good.

Example 8

A gas diffusion electrode medium, which had, on a catalyst layer side of the electrode base material, a planar microporous layer containing vapor phase growth carbon fibers having a specific aspect ratio and acetylene black, shown in Table 2, was obtained according to the methods described in Preparation of Electrode Base Material and Formation of Microporous Layer and Microporous Region. The cell performance of the obtained gas diffusion electrode medium was evaluated and, consequently, the output voltage was 0.39 V (operation temperature: 65° C., humidification temperature: 70° C., current density: 2.2 A/cm$^2$), the upper limit temperature was 91° C. (humidification temperature: 70° C., current density: 1.2 A/cm$^2$) and the electrical resistance was 8.9 mΩ·cm$^2$, and the anti-flooding characteristic, the anti-dry-out characteristic and the electrical conductivity were good together.

Example 9

A gas diffusion electrode medium, which had, on a catalyst layer side of the electrode base material, a planar microporous layer containing vapor phase growth carbon fibers having a specific aspect ratio and acetylene black, shown in Table 2, was obtained according to the methods described in Preparation of Electrode Base Material and Formation of Microporous Layer and Microporous Region. The cell performance of the obtained gas diffusion electrode medium was evaluated and, consequently, the output voltage was 0.42 V (operation temperature: 65° C., humidification temperature: 70° C., current density: 2.2 A/cm$^2$), the upper limit temperature was 93° C. (humidification temperature: 70° C., current density: 1.2 A/cm$^2$) and the electrical resistance was 6.4 mΩ·cm$^2$, and the anti-flooding characteristic, the anti-dry-out characteristic and the electrical conductivity were extremely good together.

Example 10

A gas diffusion electrode medium, which had, on a catalyst layer side of the electrode base material, a planar microporous layer containing vapor phase growth carbon fibers having a specific aspect ratio and acetylene black, shown in Table 2, was obtained according to the methods described in Preparation of Electrode Base Material and Formation of Microporous Layer and Microporous Region. The cell performance of the obtained gas diffusion electrode medium was evaluated and, consequently, the output voltage was 0.39 V (operation temperature: 65° C., humidification temperature: 70° C., current density: 2.2 A/cm$^2$), the upper limit temperature was 90° C. (humidification temperature: 70° C., current density: 1.2 A/cm$^2$) and the electrical resistance was 6.2 mΩ·cm$^2$, and the anti-flooding characteristic and the anti-dry-out characteristic were good and the electrical conductivity was extremely good.

Example 11

A gas diffusion electrode medium, which had, on a catalyst layer side of the electrode base material, a planar microporous layer containing vapor phase growth carbon fibers having a specific aspect ratio and acetylene black, shown in Table 2, was obtained according to the methods described in Preparation of Electrode Base Material and Formation of Microporous Layer and Microporous Region. The cell performance of the obtained gas diffusion electrode medium was evaluated and, consequently, the output voltage was 0.38 V (operation temperature: 65° C., humidification temperature: 70° C., current density: 2.2 A/cm$^2$), the upper limit temperature was 92° C. (humidification temperature: 70° C., current density: 1.2 A/cm$^2$) and the electrical resistance was 6.4 mΩ·cm$^2$, and the anti-flooding characteristic and the anti-dry-out characteristic were good and the electrical conductivity was extremely good together.

Example 12

A gas diffusion electrode medium, which had, on a catalyst layer side of the electrode base material, a planar microporous layer containing vapor phase growth carbon fibers having a specific aspect ratio and acetylene black and had, on a bipolar plate side, a microporous region having an areal ratio of 36%, shown in Table 2, was obtained according to the methods described in Preparation of Electrode Base Material and Formation of Microporous Layer and Microporous Region. The cell performance of the obtained gas diffusion electrode medium was evaluated and, consequently, the output voltage was 0.40 V (operation temperature: 65° C., humidification temperature: 70° C., current density: 2.2 A/cm$^2$), the upper limit temperature was 93° C. (humidification temperature: 70° C., current density: 1.2 A/cm$^2$) and the electrical resistance was 6.4 mΩ·cm$^2$, and the anti-flooding characteristic, the anti-dry-out characteristic and the electrical conductivity were extremely good together.

Example 13

A gas diffusion electrode medium, which had, on a catalyst layer side of the electrode base material, a planar microporous layer containing vapor phase growth carbon fibers having a specific aspect ratio and acetylene black and had, on a bipolar plate side, a microporous region having an areal ratio of 36%, shown in Table 2, was obtained according to the methods described in Preparation of Electrode Base Material and Formation of Microporous Layer and Microporous Region. The cell performance of the obtained gas diffusion electrode medium was evaluated and, consequently, the output voltage was 0.39 V (operation temperature: 65° C., humidification temperature: 70° C., current density: 2.2 A/cm$^2$), the upper limit temperature was 93° C. (humidification temperature: 70° C., current density: 1.2 A/cm$^2$) and the electrical resistance was 5.6 mΩ·cm$^2$, and the anti-flooding characteristic was good, and the anti-dry-out characteristic and the electrical conductivity were extremely good.

Example 14

A gas diffusion electrode medium, which had, on a catalyst layer side of the electrode base material, a planar microporous layer containing vapor phase growth carbon fibers having a specific aspect ratio and acetylene black and had, on a bipolar plate side, a microporous region having an areal ratio of 36%, shown in Table 2, was obtained according to the methods described in Preparation of Electrode Base Material and Formation of Microporous Layer and Microporous Region. The cell performance of the obtained gas diffusion electrode medium was evaluated and, consequently, the output voltage was 0.42 V (operation temperature: 65° C., humidification temperature: 70° C., current density: 2.2 A/cm$^2$), the upper limit temperature was 93° C. (humidification temperature: 70° C., current density: 1.2 A/cm$^2$) and the electrical resistance was 5.3 mΩ·cm$^2$, and the anti-flooding characteristic, the anti-dry-out characteristic and the electrical conductivity were extremely good together.

Example 15

A gas diffusion electrode medium, which had, on a catalyst layer side of the electrode base material, a planar microporous layer containing vapor phase growth carbon fibers having a specific aspect ratio and acetylene black, shown in Table 3, was obtained according to the methods described in Preparation of Electrode Base Material and Formation of Microporous Layer and Microporous Region. The cell performance of the obtained gas diffusion electrode medium was evaluated and, consequently, the output voltage was 0.41 V (operation temperature: 65° C., humidification temperature: 70° C., current density: 2.2 A/cm$^2$), the upper limit temperature was 92° C. (humidification temperature: 70° C., current density: 1.2 A/cm$^2$) and the electrical resistance was 7.4 mΩ·cm$^2$, and the anti-flooding characteristic and the electrical conductivity were extremely good, and the anti-dry-out characteristic was good.

Example 16

A gas diffusion electrode medium, which had, on a catalyst layer side of the electrode base material, a planar microporous layer containing vapor phase growth carbon fibers having a specific aspect ratio and acetylene black, shown in Table 3, was obtained according to the methods described in Preparation of Electrode Base Material and Formation of Microporous Layer and Microporous Region. The cell performance of the obtained gas diffusion electrode medium was evaluated and, consequently, the output voltage was 0.38 V (operation temperature: 65° C., humidification temperature: 70° C., current density: 2.2 A/cm$^2$), the upper limit temperature was 89° C. (humidification temperature: 70° C., current density: 1.2 A/cm$^2$) and the electrical resistance was 9.1 mΩ·cm$^2$, and the anti-flooding characteristic, the anti-dry-out characteristic and the electrical conductivity were good together.

Example 17

A gas diffusion electrode medium, which had, on a catalyst layer side of the electrode base material, a planar microporous layer containing vapor phase growth carbon fibers having a specific aspect ratio and acetylene black, shown in Table 3, was obtained according to the methods described in Preparation of Electrode Base Material and Formation of Microporous Layer and Microporous Region. The cell performance of the obtained gas diffusion electrode medium was evaluated and, consequently, the output voltage was 0.39 V (operation temperature: 65° C., humidification temperature: 70° C., current density: 2.2 A/cm$^2$), the upper limit temperature was 89° C. (humidification temperature: 70° C., current density: 1.2 A/cm$^2$) and the electrical resistance was 5.8 mΩ·cm$^2$, and the anti-flooding characteristic and the anti-dry-out characteristic were good, and the electrical conductivity was extremely good.

Example 18

A gas diffusion electrode medium, which had, on a catalyst layer side of the electrode base material, a planar microporous layer containing vapor phase growth carbon fibers having a specific aspect ratio, shown in Table 3, was obtained according to the methods described in Preparation of Electrode Base Material and Formation of Microporous Layer and Microporous Region. The cell performance of the obtained gas diffusion electrode medium was evaluated and, consequently, the output voltage was 0.40 V (operation temperature: 65° C., humidification temperature: 70° C., current density: 2.2 A/cm$^2$), the upper limit temperature was 92° C. (humidification temperature: 70° C., current density: 1.2 A/cm$^2$) and the electrical resistance was 8.2 mΩ·cm$^2$, and the anti-flooding characteristic was extremely good, and the anti-dry-out characteristic and the electrical conductivity were both good. A distribution of a water-repelling material of a cross section of the electrode base material was measured before applying the carbon coating liquid onto the electrode base material and, consequently, the index of the distribution of a water-repelling material was 5.0. The distribution of a water-repelling material of a cross section of the gas diffusion electrode medium was measured after applying and drying the carbon coating liquid and, consequently, the index of the distribution of a water-repelling material was 5.5.

Example 19

A gas diffusion electrode medium, which had, on a catalyst layer side of the electrode base material, a planar microporous layer containing vapor phase growth carbon fibers having a specific aspect ratio and acetylene black, shown in Table 3, was obtained according to the methods described in Preparation of Electrode Base Material and Formation of Microporous Layer and Microporous Region. The cell performance of the obtained gas diffusion electrode medium was evaluated and, consequently, the output voltage was 0.41 V (operation temperature: 65° C., humidification temperature: 70° C., current density: 2.2 A/cm$^2$), the upper limit temperature was 93° C. (humidification temperature: 70° C., current density: 1.2 A/cm$^2$) and the electrical resistance was 7.1 mΩ·cm$^2$, and the anti-flooding characteristic, the anti-dry-out characteristic and the electrical conductivity were extremely good together. A distribution of a water-repelling material of a cross section of the electrode base material was measured before applying the carbon coating liquid onto the electrode base material and, consequently, the index of the distribution of a water-repelling material was 5.0. The distribution of a water-repelling material of a cross section of the gas diffusion electrode medium was measured after applying and drying the carbon coating liquid and, consequently, the index of the distribution of a water-repelling material was 5.5.

Example 20

A gas diffusion electrode medium, which had, on a catalyst layer side of the electrode base material, a planar microporous layer containing vapor phase growth carbon fibers having a specific aspect ratio and acetylene black and had, on a bipolar plate side, a microporous region having an areal ratio of 36%, shown in Table 3, was obtained according to the methods described in Preparation of Electrode Base Material and Formation of Microporous Layer and Microporous Region. The cell performance of the obtained gas diffusion electrode medium was evaluated and, consequently, the output voltage was 0.41 V (operation temperature: 65° C., humidification temperature: 70° C., current density: 2.2 A/cm$^2$), the upper limit temperature was 93° C. (humidification temperature: 70° C., current density: 1.2 A/cm$^2$) and the electrical resistance was 6.0 mΩ·cm$^2$, and the anti-flooding characteristic, the anti-dry-out characteristic and the electrical conductivity were extremely good together.

TABLE 1

| | | Example 1 | Example 2 | Example 3 | Example 4 | Example 5 | Example 6 | Example 7 |
|---|---|---|---|---|---|---|---|---|
| | Composition of Carbon Coating Liquid | | | | | | | |
| Microporous Layer [Catalyst Layer Side] | Vapor phase growth carbon fiber (Aspect Ratio: 50) | 7.7 | 4.2 | 2.3 | 0.3 | — | — | 2.3 |
| | Vapor phase growth carbon fiber (Aspect Ratio: 110) | — | — | — | — | 2.3 | — | — |
| | Multilayer Carbon Nanotube (Aspect Ratio: 1300) | — | — | — | — | — | 2.3 | — |
| | Acetylene Black (Aspect Ratio: 1) | — | 3.4 | 5.4 | 7.4 | 5.4 | 5.4 | — |
| | Furnace Black (Aspect Ratio: 1) | — | — | — | — | — | — | 5.4 |
| | PTFE Resin | 2.5 | 2.5 | 2.5 | 2.5 | 2.5 | 2.5 | 2.5 |
| | Surfactant | 14 | 14 | 14 | 14 | 14 | 14 | 14 |
| | Purified Water | 75.8 | 75.8 | 75.8 | 75.8 | 75.8 | 75.8 | 75.8 |
| | Mixing Mass Ratio of Carbon Black | 0 | 0.8 | 2.3 | 24 | 2.3 | 2.3 | 2.3 |
| | Areal Weight [g/m$^2$] | 20 | 20 | 20 | 20 | 20 | 20 | 20 |
| Microporous Region [Bipolar Plate Side] | Areal Ratio [%] | — | — | — | — | — | — | — |
| Electrode Base Material | Areal Weight [g/m$^2$] | 25 | 25 | 25 | 25 | 25 | 25 | 25 |
| | Method of Water Repellent Treatment | A | A | A | A | A | A | A |
| Gas Diffusion Electrode Medium | Areal Weight [g/m$^2$] | 45 | 45 | 45 | 45 | 45 | 45 | 45 |
| | Thickness [μm] | 141 | 140 | 140 | 138 | 140 | 140 | 138 |
| | Electrical Resistance [mΩ · cm$^2$] | 8.6 | 8.5 | 7.5 | 9.0 | 7.4 | 7.3 | 7.4 |
| | Gas Permeation Resistance in Direction Perpendicular to Plane [mmAq] | 16 | 59 | 125 | 180 | 114 | 114 | 116 |
| Anti-flooding Characteristic | Output Voltage [V] | 0.39 | 0.39 | 0.40 | 0.38 | 0.40 | 0.41 | 0.40 |
| Anti-dry-out Characteristic | Upper Limit Temperature [° C.] | 90 | 91 | 92 | 90 | 92 | 92 | 92 |

TABLE 2

| | | Example 8 | Example 9 | Example 10 | Example 11 | Example 12 | Example 13 | Example 14 |
|---|---|---|---|---|---|---|---|---|
| | Composition of Carbon Coating Liquid | | | | | | | |
| Microporous Layer [Catalyst Layer Side] | Vapor phase growth carbon fiber (Aspect Ratio: 50) | 2.3 | 2.3 | 2.3 | 2.3 | 2.3 | 2.3 | 2.3 |
| | Acetylene Black (Aspect Ratio: 1) | 5.4 | 5.4 | 5.4 | 5.4 | 5.4 | 5.4 | 5.4 |
| | PTFE Resin | 2.5 | 2.5 | 2.5 | 2.5 | 2.5 | 2.5 | 2.5 |
| | Surfactant | 14 | 14 | 14 | 14 | 14 | 14 | 14 |
| | Purified Water | 75.8 | 75.8 | 75.8 | 75.8 | 75.8 | 75.8 | 75.8 |
| | Mixing Mass Ratio of Carbon Black | 2.3 | 2.3 | 2.3 | 2.3 | 2.3 | 2.3 | 2.3 |
| | Areal Weight [g/m$^2$] | 30 | 16 | 9 | 20 | 20 | 20 | 16 |
| Microporous Region [Bipolar Plate Side] | Areal Ratio [%] | — | — | — | — | 36 | 36 | 36 |
| Electrode Base Material | Areal Weight [g/m$^2$] | 25 | 25 | 25 | 37 | 25 | 33 | 25 |
| | Method of Water Repellent Treatment | A | A | A | A | A | A | A |
| Gas Diffusion Electrode Medium | Areal Weight [g/m$^2$] | 55 | 41 | 34 | 57 | 49 | 57 | 45 |
| | Thickness [μm] | 170 | 158 | 107 | 141 | 150 | 150 | 168 |
| | Electrical Resistance [mΩ · cm$^2$] | 8.9 | 6.4 | 6.2 | 6.4 | 6.4 | 5.6 | 5.3 |
| | Gas Permeation Resistance in Direction Perpendicular to Plane [mmAq] | 199 | 92 | 43 | 181 | 136 | 171 | 103 |

TABLE 2-continued

|  |  | Example 8 | Example 9 | Example 10 | Example 11 | Example 12 | Example 13 | Example 14 |
|---|---|---|---|---|---|---|---|---|
| Anti-flooding Characteristic | Output Voltage [V] | 0.39 | 0.42 | 0.39 | 0.38 | 0.40 | 0.39 | 0.42 |
| Anti-dry-out Characteristic | Upper Limit Temperature [° C.] | 91 | 93 | 90 | 92 | 93 | 93 | 93 |

TABLE 3

|  |  | Example 15 | Example 16 | Example 17 | Example 18 | Example 19 | Example 20 |
|---|---|---|---|---|---|---|---|
| Microporous Layer [Catalyst Layer Side] | Composition of Carbon Coating Liquid |  |  |  |  |  |  |
|  | Vapor phase growth carbon fiber (Aspect Ratio: 50) | 2.3 | 2.3 | 2.3 | 7.7 | 2.3 | 2.3 |
|  | Acetylene Black (Aspect Ratio: 1) | 5.4 | 5.4 | 5.4 | — | 5.4 | 5.4 |
|  | PTFE Resin | 2.5 | 2.5 | 2.5 | 2.5 | 2.5 | 2.5 |
|  | Surfactant | 14 | 14 | 14 | 14 | 14 | 14 |
|  | Purified Water | 75.8 | 75.8 | 75.8 | 75.8 | 75.8 | 75.8 |
|  | Mixing Mass Ratio of Carbon Black | 2.3 | 2.3 | 2.3 | 0 | 2.3 | 2.3 |
|  | Areal Weight [g/m$^2$] | 20 | 37 | 7 | 20 | 20 | 20 |
| Microporous Region [Bipolar Plate Side] | Areal Ratio [%] | — | — | — | — | — | 36 |
| Electrode Base Material | Areal Weight [g/m$^2$] | 20 | 20 | 25 | 25 | 25 | 25 |
|  | Method of Water Repellent Treatment | A | A | A | B | B | B |
| Gas Diffusion Electrode Medium | Areal Weight [g/m$^2$] | 40 | 57 | 32 | 45 | 45 | 49 |
|  | Thickness [μm] | 120 | 181 | 105 | 146 | 145 | 120 |
|  | Electrical Resistance [mΩ · cm$^2$] | 7.4 | 9.1 | 5.8 | 8.2 | 7.1 | 6.0 |
|  | Gas Permeation Resistance in Direction Perpendicular to Plane [mmAq] | 114 | 213 | 10 | 92 | 147 | 147 |
| Anti-flooding Characteristic | Output Voltage [V] | 0.41 | 0.38 | 0.39 | 0.40 | 0.41 | 0.41 |
| Anti-dry-out Characteristic | Upper Limit Temperature [° C.] | 92 | 89 | 89 | 92 | 93 | 93 |

Comparative Example 1

A gas diffusion electrode medium, which had, on a catalyst layer side of the electrode base material, a planar microporous layer containing acetylene black, shown in Table 4, was obtained according to the methods described in Preparation of Electrode Base Material and Formation of Microporous Layer and Microporous Region. The cell performance of the obtained gas diffusion electrode medium was evaluated and, consequently, the output voltage was 0.30 V (operation temperature: 65° C., humidification temperature: 70° C., current density: 2.2 A/cm$^2$), the upper limit temperature was 85° C. (humidification temperature: 70° C., current density: 1.2 A/cm$^2$) and the electrical resistance was 7.5 mΩ·cm$^2$, and the electrical conductivity was extremely good, but the anti-flooding characteristic and the anti-dry-out characteristic were insufficient.

Comparative Example 2

A gas diffusion electrode medium, which had, on a catalyst layer side of the electrode base material, a planar microporous layer containing acetylene black, shown in Table 4, was obtained according to the methods described in Preparation of Electrode Base Material and Formation of Microporous Layer and Microporous Region. The cell performance of the obtained gas diffusion electrode medium was evaluated and, consequently, the output voltage was 0.35 V (operation temperature: 65° C., humidification temperature: 70° C., current density: 2.2 A/cm$^2$), the upper limit temperature was 88° C. (humidification temperature: 70° C., current density: 1.2 A/cm$^2$) and the electrical resistance was 9.2 mΩ·cm$^2$, and the anti-flooding characteristic was good, but the anti-dry-out characteristic and the electrical conductivity were both insufficient.

Comparative Example 3

A gas diffusion electrode medium, which had, on a catalyst layer side of the electrode base material, a planar microporous layer containing vapor phase growth carbon fibers having a specific aspect ratio and acetylene black, shown in Table 4, was obtained according to the methods described in Preparation of Electrode Base Material and Formation of Microporous Layer and Microporous Region. The cell performance of the obtained gas diffusion electrode medium was evaluated and, consequently, the output voltage was 0.33 V (operation temperature: 65° C., humidification temperature: 70° C., current density: 2.2 A/cm$^2$), the upper limit temperature was 86° C. (humidification temperature: 70° C., current density: 1.2 A/cm$^2$) and the electrical resistance was 6.3 Ω·cm$^2$, and the electrical conductivity was extremely good, but the anti-flooding characteristic was deteriorated a little and the anti-dry-out characteristic was insufficient.

Comparative Example 4

A gas diffusion electrode medium, which had, on a catalyst layer side of the electrode base material, a planar microporous layer containing vapor phase growth carbon fibers having a specific aspect ratio and acetylene black, shown in Table 4, was obtained according to the methods described in Preparation of Electrode Base Material and Formation of Microporous Layer and Microporous Region. The cell performance of the obtained gas diffusion electrode medium was evaluated and, consequently, the output voltage was 0.37 V (operation temperature: 65° C., humidification temperature: 70° C., current density: 2.2 A/cm$^2$), the upper limit temperature was 87° C. (humidification temperature: 70° C., current density: 1.2 A/cm$^2$) and the electrical resistance was 5.8 Ω·cm$^2$, and the electrical conductivity was extremely good and the anti-flooding characteristic was good, but the anti-dry-out characteristic was insufficient.

Comparative Example 5

A gas diffusion electrode medium, which had, on a catalyst layer side of the electrode base material, a planar microporous layer containing vapor phase growth carbon fibers having a specific aspect ratio, shown in Table 4, was obtained according to the methods described in Preparation of Electrode Base Material and Formation of Microporous Layer and Microporous Region. The cell performance of the obtained gas diffusion electrode medium was evaluated and, consequently, the output voltage was 0.32 V (operation temperature: 65° C., humidification temperature: 70° C., current density: 2.2 A/cm$^2$), the upper limit temperature was 86° C. (humidification temperature: 70° C., current density: 1.2 A/cm$^2$) and the electrical resistance was 7.4 mΩ·cm$^2$, and the electrical conductivity was extremely good, but the anti-flooding characteristic was deteriorated a little and the anti-dry-out characteristic was insufficient.

Comparative Example 6

A gas diffusion electrode medium, which had, on a catalyst layer side of the electrode base material, a planar microporous layer containing vapor phase growth carbon fibers having a specific aspect ratio, shown in Table 4, was obtained according to the methods described in Preparation of Electrode Base Material and Formation of Microporous Layer and Microporous Region. The cell performance of the obtained gas diffusion electrode medium was evaluated and, consequently, the output voltage was 0.36 V (operation temperature: 65° C., humidification temperature: 70° C., current density: 2.2 A/cm$^2$), the upper limit temperature was 86° C. (humidification temperature: 70° C., current density: 1.2 A/cm$^2$) and the electrical resistance was 6.9 mΩ·cm$^2$, and the electrical conductivity was extremely good and the anti-flooding characteristic was good, but the anti-dry-out characteristic was insufficient.

Comparative Example 7

A gas diffusion electrode medium, which had, on a catalyst layer side of the electrode base material, a planar microporous layer containing acetylene black, shown in Table 4, was obtained according to the methods described in Preparation of Electrode Base Material and Formation of Microporous Layer and Microporous Region. The cell performance of the obtained gas diffusion electrode medium was evaluated and, consequently, the output voltage was 0.35 V (operation temperature: 65° C., humidification temperature: 70° C., current density: 2.2 A/cm$^2$), the upper limit temperature was 88° C. (humidification temperature: 70° C., current density: 1.2 A/cm$^2$) and the electrical resistance was 9.2 mΩ·cm$^2$, and the anti-flooding characteristic was good, but the anti-dry-out characteristic and the electrical conductivity were both insufficient.

Comparative Example 8

It was attempted to prepare an electrode base material with an areal weight of 10 g/m$^2$ by following the method described in the above-mentioned preparation of an electrode base material with an areal weight of 25 g/m$^2$ except to change the carbon fiber areal weight to 7.8 g/m$^2$, and a gas diffusion electrode medium which had, on a catalyst layer side of the electrode base material, a planar microporous layer containing acetylene black, shown in Table 4, according to the methods described in Preparation of Electrode Base Material and Formation of Microporous Layer and Microporous Region, but the base material was broken in the papermaking step to fail to prepare a carbon fiber paper sheet.

TABLE 4

| | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| | Composition of Carbon Coating Liquid | | | | | | | | |
| Microporous Layer [Catalyst Layer Side] | Vapor phase growth carbon fiber (Aspect Ratio: 50) | — | — | 2.3 | 2.3 | 7.7 | 7.7 | — | 2.3 |
| | Acetylene Black (Aspect Ratio: 1) | 7.7 | 7.7 | 5.4 | 5.4 | — | — | 7.7 | 5.4 |
| | PTFE Resin | 2.5 | 2.5 | 2.5 | 2.5 | 2.5 | 2.5 | 2.5 | 2.5 |
| | Surfactant | 14 | 14 | 14 | 14 | 14 | 14 | 14 | 14 |
| | Purified Water | 75.8 | 75.8 | 75.8 | 75.8 | 75.8 | 75.8 | 75.8 | 75.8 |
| | Mixing Mass Ratio of Carbon Black | — | — | 2.3 | 2.3 | — | — | — | 2.3 |
| | Areal Weight [g/m$^2$] | 20 | 20 | 20 | 20 | 20 | 20 | 20 | 16 |
| Microporous Region [Bipolar Plate Side] | Areal Ratio [%] | — | — | — | — | — | — | — | — |
| Electrode Base Material | Areal Weight [g/m$^2$] | 84 | 25 | 84 | 44 | 84 | 44 | 25 | 10 |
| | Method of Water Repellent Treatment | A | A | A | A | A | A | B | — |

TABLE 4-continued

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Gas Diffusion Electrode Medium | Areal Weight [g/m²] | 104 | 45 | 104 | 65 | 104 | 65 | 45 | — |
|  | Thickness [μm] | 230 | 140 | 230 | 150 | 230 | 150 | 140 | — |
|  | Electrical Resistance [mΩ · cm²] | 7.5 | 9.2 | 6.3 | 5.8 | 7.4 | 6.9 | 9.2 | — |
|  | Gas Permeation Resistance in Direction Perpendicular to Plane [mmAq] | 213 | 198 | 202 | 198 | 197 | 192 | 199 | — |
| Anti-flooding Characteristic | Output Voltage [V] | 0.30 | 0.35 | 0.33 | 0.37 | 0.32 | 0.36 | 0.35 | — |
| Anti-dry-out Characteristic | Upper Limit Temperature [° C.] | 85 | 88 | 86 | 87 | 86 | 86 | 88 | — |

The invention claimed is:

1. A gas diffusion electrode medium for a fuel cell in which a microporous layer is arranged at one surface of an electrode base material, wherein the microporous layer contains a linear carbon having an aspect ratio of 30 to 5000, and an areal weight of the gas diffusion electrode medium is 30 to 57 g/m².

2. The gas diffusion electrode medium according to claim 1, wherein thickness of the gas diffusion electrode medium is 70 to 190 μm.

3. The gas diffusion electrode medium according to claim 1, wherein gas permeation resistance in a direction perpendicular to a plane is 15 to 190 mmAq.

4. The gas diffusion electrode medium according to claim 1, wherein a ratio of fluorine to carbon is different between one surface and an opposite surface of the electrode base material to be used for the gas diffusion electrode medium, and the microporous layer is arranged on the surface on a side where the ratio of fluorine to carbon is higher.

5. The gas diffusion electrode medium according to claim 1, wherein a microporous region having an areal ratio of 5 to 70% is arranged on the opposite surface from the surface of the electrode base material on which the microporous layer is arranged.

6. A gas diffusion electrode medium for a fuel cell in which a microporous layer is arranged at one surface of an electrode base material, wherein the microporous layer contains a linear carbon having an aspect ratio of 30 to 5000, the areal weight of the microporous layer is 10 to 35 g/m², and an areal weight of the gas diffusion electrode medium is 30 to 60 g/m².

7. The gas diffusion electrode medium according to claim 6, wherein gas permeation resistance in a direction perpendicular to a plane is 15 to 190 mmAq.

8. The gas diffusion electrode medium according to claim 2, wherein gas permeation resistance in a direction perpendicular to a plane is 15 to 190 mmAq.

9. The gas diffusion electrode medium according to claim 6, wherein a ratio of fluorine to carbon is different between one surface and an opposite surface of the electrode base material to be used for the gas diffusion electrode medium, and the microporous layer is arranged on the surface on a side where the ratio of fluorine to carbon is higher.

10. The gas diffusion electrode medium according to claim 2, wherein a ratio of fluorine to carbon is different between one surface and an opposite surface of the electrode base material to be used for the gas diffusion electrode medium, and the microporous layer is arranged on the surface on a side where the ratio of fluorine to carbon is higher.

11. The gas diffusion electrode medium according to claim 3, wherein a ratio of fluorine to carbon is different between one surface and an opposite surface of the electrode base material to be used for the gas diffusion electrode medium, and the microporous layer is arranged on the surface on a side where the ratio of fluorine to carbon is higher.

12. The gas diffusion electrode medium according to claim 6, wherein the microporous layer contains carbon black and a mixing mass ratio of the carbon black to the linear carbon having an aspect ratio of 30 to 5000 is 0.5 to 20.

13. The gas diffusion electrode medium according to claim 2, wherein the microporous layer contains carbon black and a mixing mass ratio of the carbon black to the linear carbon having an aspect ratio of 30 to 5000 is 0.5 to 20.

14. The gas diffusion electrode medium according to claim 3, wherein the microporous layer contains carbon black and a mixing mass ratio of the carbon black to the linear carbon having an aspect ratio of 30 to 5000 is 0.5 to 20.

15. The gas diffusion electrode medium according to claim 4, wherein the microporous layer contains carbon black and a mixing mass ratio of the carbon black to the linear carbon having an aspect ratio of 30 to 5000 is 0.5 to 20.

16. The gas diffusion electrode medium according to claim 6, wherein a microporous region having an areal ratio of 5 to 70% is arranged on the opposite surface from the surface of the electrode base material on which the microporous layer is arranged.

17. The gas diffusion electrode medium according to claim 2, wherein a microporous region having an areal ratio of 5 to 70% is arranged on the opposite surface from the surface of the electrode base material on which the microporous layer is arranged.

18. The gas diffusion electrode medium according to claim 3, wherein a microporous region having an areal ratio of 5 to 70% is arranged on the opposite surface from the surface of the electrode base material on which the microporous layer is arranged.

19. A gas diffusion electrode medium for a fuel cell in which a microporous layer is arranged at one surface of an electrode base material, wherein the microporous layer contains a linear carbon having an aspect ratio of 30 to 5000, the microporous layer contains carbon black and a mixing mass ratio of the carbon black to the linear carbon fiber having an aspect ratio of 30 to 5000 is 0.5 to 20, and an areal weight of the gas diffusion electrode medium is 30 to 60 g/m².

20. The gas diffusion electrode medium according to claim 6, wherein thickness of the gas diffusion electrode medium is 70 to 190 μm.

\* \* \* \* \*